US006996171B1

(12) United States Patent
Walker et al.

(10) Patent No.: US 6,996,171 B1
(45) Date of Patent: Feb. 7, 2006

(54) DATA DESCRIBING METHOD AND DATA PROCESSOR

(75) Inventors: Toby Walker, Kanagawa (JP); Hiroshi Matsubara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/647,265

(22) PCT Filed: Jan. 27, 2000

(86) PCT No.: PCT/JP00/00424

§ 371 (c)(1),
(2), (4) Date: Nov. 9, 2000

(87) PCT Pub. No.: WO00/45596

PCT Pub. Date: Aug. 3, 2000

(30) Foreign Application Priority Data

Jan. 29, 1999 (JP) ................................ 11/023068

(51) Int. Cl.
*H04B 1/66* (2006.01)
*H04N 7/12* (2006.01)
*G06K 3/36* (2006.01)

(52) U.S. Cl. .............................................. 375/240.09
(58) Field of Classification Search ........... 375/240.09, 375/240.01, 240.1, 240.11, 240.12; 345/723, 345/745, 473; 382/199, 100, 232, 190, 173, 382/165; 386/46; 707/102; 348/722; H04N 7/12; G06K 3/36; H04B 1/66
See application file for complete search history.

(56) References Cited

U.S. PATENT DOCUMENTS

| 5,546,475 | A  | * | 8/1996 | Bolle et al. ................. 382/190 |
| 5,630,006 | A  |   | 5/1997 | Hirayama |
| 5,805,733 | A  | * | 9/1998 | Wang et al. ................ 382/232 |
| 5,821,945 | A  |   | 10/1998 | Yeo et al. |
| 6,038,367 | A  | * | 3/2000 | Abecassis ..................... 386/46 |
| 6,081,278 | A  | * | 6/2000 | Chen .......................... 345/473 |
| 6,195,458 | B1 | * | 2/2001 | Warnick et al. ............. 382/173 |
| 6,195,661 | B1 | * | 2/2001 | Filepp et al. ............... 707/102 |
| 6,223,183 | B1 | * | 4/2001 | Smith et al. ................ 707/102 |
| 6,236,395 | B1 | * | 5/2001 | Sezan et al. ................ 345/723 |
| 6,373,979 | B1 | * | 4/2002 | Wang ......................... 382/165 |
| 6,411,724 | B1 | * | 6/2002 | Vaithilingam et al. ...... 382/100 |
| 6,448,980 | B1 | * | 9/2002 | Kumar et al. ............... 345/745 |
| 6,710,822 | B1 | * | 3/2004 | Walker et al. ............. 348/722 |
| 2002/0061136 | A1 | * | 5/2002 | Shibata et al. ............. 382/199 |

FOREIGN PATENT DOCUMENTS

| EP | 0 472 806 | 3/1992 |
| EP | 0 677 842 A1 | 10/1995 |
| EP | 0 878 767 | 11/1998 |

(Continued)

*Primary Examiner*—Tung Vo
(74) *Attorney, Agent, or Firm*—Finnegan, Henderson, Farabow, Garrett & Dunner, L.L.P.

(57) ABSTRACT

As a unit element for defining a describing procedure for description of a feature data characteristic of the content of a video data, a descriptor is formed in a description format structured to have its attribute as lower-level element and which may include other descriptor as attribute. That is, the description format for the descriptor consists of a feature indicative of a descriptor or attribute as lower level element, and a feature type indicative of the data type of the feature.

14 Claims, 27 Drawing Sheets

FOREIGN PATENT DOCUMENTS

| | | |
|---|---|---|
| EP | 0 907 147 | 4/1999 |
| JP | 9-247602 | 9/1997 |
| JP | 11-289517 | 4/1998 |
| JP | 11-225307 | 8/1998 |
| JP | 10-340570 | 12/1998 |
| JP | 11-103441 | 4/1999 |
| JP | 11-341443 | 12/1999 |
| WO | 95/12197 | 5/1995 |

* cited by examiner

| Descriptor | | Superclass | |
|---|---|---|---|
| Feature : | Type | Example Value | |
| ⋮ | ⋮ | ⋮ | |

FIG.3

| Descriptor :<br>AVElement | | Superclass :<br>None |
|---|---|---|
| Feature : | Feature :<br>Type | Example<br>Value |

FIG.5

| Descriptor :<br>AVSegment | | Superclass :<br>AVElement |
|---|---|---|
| Feature : | Feature<br>Type | Example<br>Value : |
| StartPoint | Position | |
| EndPoint | Position | |
| Streams | Streamref | |
| Abstract | Avabstract | Key frame |
| Concept | Concept | An RDF structure describing the content of this segment |

FIG.6

| Descriptor:<br>AVAbstract | Superclass:<br>AVElement | |
|---|---|---|
| Feature: | Feature Type | Example Value: |

FIG.7

| Descriptor:<br>AVPrototype | Superclass:<br>AVAbstract | |
|---|---|---|
| Feature: | Feature Type | Example Value: |
| Kind | String | "Shot"<br>"Scene"<br>"VisualFrame" |
| Weights | WeightVector | |
| Feature1 | Descriptor1 | |
| Feature2 | Descriptor2 | |
| ... | ... | ... |
| Featuren | Descriptorn | |

FIG.8

| Descriptor : Hierarchy | Superclass : AVElement | |
|---|---|---|
| Feature : | Feature Type | Example Value : |
| Root | Cluster | |
| Kind | String | |

FIG.10

| Descriptor : Cluster | Superclass : AVElement | |
|---|---|---|
| Feature : | Feature Type | Example Value : |
| Members | AVElement | |
| Abstract | AVAbstract | |

FIG.11

| Descriptor: CompositeSegment | Superclass: AVSegment | |
|---|---|---|
| Feature: | Feature Type | Example Value: |
| Components | AVSegment | |
| | | |

| Descriptor :<br>AVGraph | | Superclass :<br>AVElement | |
|---|---|---|---|
| Feature : | Feature<br>Type | Example<br>Value : | |
| Edges | AVGraphEdge | | |
| Kind | String | | |

FIG.15

| Descriptor:<br>AVGraphEdge | | Superclass:<br>None |
|---|---|---|
| Feature: | Feature Type | Example Value: |
| Source | AVElement | |
| Target | AVElement | |
| Label | String | "follows"<br>"similarTo" |

FIG.17

| Descriptor:<br>Signature | | Superclass:<br>AVAbstract |
|---|---|---|
| Feature: | Feature Type | Example Value: |
| Weights | WeightVector | |
| Members | AVElement | |
| Kind | String | |

FIG.18

| Descriptor :<br>TemporalSignature | Superclass :<br>AVAbstract | |
|---|---|---|
| Feature : | Feature Type | Example Value : |
| Time | WeightVector | |
| Members | AVElement | |
| Kind | String | |

FIG.19

| Descriptor :<br>ActivityLevel | Superclass :<br>None | |
|---|---|---|
| Feature : | Feature Type | Example Value : |
| ActivityLevel | Real | |

FIG.20

| Descriptor:<br>WeightVector | | Superclass:<br>None |
|---|---|---|
| Feature: | Feature Type | Example Value: |
| Weights | Real[n] | |
| Normalized | Boolean | |

FIG.21

| Descriptor:<br>Concept | | Superclass:<br>None |
|---|---|---|
| Feature: | Feature Type | Example Value: |
| Concept | RDFNode or XML or ... | |

FIG.22

| Descriptor :
Synopsis | Superclass :
AVElement | |
|---|---|---|
| Feature :
Concept | Feature
Type | Example
Value : |
| Kind | String | |
| Sequence | AVElement | |
| IsOrdered | Boolean | |

FIG.23

| Descriptor :
Color | Superclass :
None | |
|---|---|---|
| Feature : | Feature
Type | Example
Value : |
| Color | Real[3] | |

FIG.24

| Descriptor : ColorSpace | Super type : None | |
|---|---|---|
| Feature : | Feature Type | Example Value : |
| ColorSpace | String | "HSV" |

FIG.25

| Descriptor : ColorSignature | Super type : None | |
|---|---|---|
| Feature : | Feature Type | Example Value : |
| ColorSpace | ColorSpace | |
| Colors | Color[n] | |
| Weights | WeightVector | |

FIG.26

| Descriptor :<br>AudioFrame | Superclass :<br>AVSegment | |
|---|---|---|
| Feature : | Feature Type | Example Value : |

FIG.27

| Descriptor :<br>VisualFrame | Superclass :<br>AVSegment | |
|---|---|---|
| Feature : | Feature Type | Example Value : |
| Color | ColorSignature | |

FIG.28

| Descriptor :<br>BrowsingNode | | Superclass :<br>CompositeSegment |
|---|---|---|
| Feature : | Feature Type | Example Value : |
| Index | AVHierarchy | A classification of the shots in a video |
| Synopsis | AVSynopsis | Sequence of key frames |
| Structure | AVGraph | |

FIG.29

| Descriptor :<br>Shot | | Superclass :<br>BrowsingNode |
|---|---|---|
| Feature : | Feature Type | Example Value : |
| Activity | ActivityLevel | "0.5" |
| Abstract | From AVSegment | |
| Synopsis | From BrowsingNode | |
| Index | From BrowsingNode | |

FIG.30

| Descriptor :
Scene | | Superclass :
BrowsingNode |
|---|---|---|
| Feature : | Feature Type | Example Value : |
| Kind | String | "DIALOG"
"COMMERICAL"
"ACTION"
"ANCHOR" |
| Abstract | From AVSegment | |
| Synopsis | From BrowsingNode | |
| Index | From BrowsingNode | |
| Structure | From BrowsingNode | |

FIG.31

| Descriptor : Program | | Super type : BrowsingNode |
|---|---|---|
| Feature : | Feature Type | Example Value : |
| Abstract | From AVSegment | Kind : SCENE ABSTRACT SHOT ABSTRACT |
| Synopsis | From BrowsingNode | |
| Index | From BrowsingNode | |
| Structure | From BrowsingNode | |

FIG.32

```
<scene>
        <startPoint>12547</startPoint>              ;AVSegment
        <endPoint>12830</endPoint>                  ;AVSegment
        <streams>{video}</streams>                  ;AVSegment
        <synopsis kind=KEY_FRAME>                   ;BrowsingNode
                <sequence>
                        < KEY_FRAME refid= KEY_FRAME 1>
                        < KEY_FRAME refid= KEY_FRAME 2>
                        < KEY_FRAME refid= KEY_FRAME 3>
                </sequence>
        </synopsis>
        <abstract>                                  ;AVSegment
                <signature kind=SHOT_SIGNATURE>
                        <members>
                                <shot refid=shot1> <shot refid=shot2>
                                <shot refid=shot3>
                        </members>
                        <weights>0.1 0.45 0.45</weights>
                </signature>
        </abstract>
        <components>                                ;CompositeSegment
                <shot id=shot1>                     ;Shot
                        <startPoint>12547</startPoint>   ;AVSegment
                        <endPoint>12616</endPoint>       ;AVSegment
                        <abstract>                       ;AVSegment
                                <signature kind=FRAME_SIGNATURE>
                                        <member><frame refid=12590></members>
                                        <weights>1.0</weights>
                                </signature>
                        </abstract>
                </shot>
                <shot id=shot2>
                        <startPoint>12617</startPoint>
                        <endPoint>12628</endPoint>
                        ...
                </shot>
                ...
                <shot id=shotn>...</shot>
        </components>
        <index>                                     ;BrowsingNode
                <hierarchy kind=SHOT_INDEX>         ;Hierarchy
                        <cluster id=cluster1>
                                <members>
                                        <shot refid=shot2> <shot refid=shot4>...
                                </members>          ;Cluster
                                <abstract>
                                        <prototype>shot 4</prototype>
                                </abstract>
                        </cluster>
                        <cluster id=cluster2>...</cluster>
                        <cluster id=cluster3>...</cluster>
                </hierarchy>
        </index>
        ...
        <structure>                                 ;BrowsingNode
                <avgraph kind=SHOT_GROUP>           ;AVGraph
                        <avgraphedge source=start target=cluster1>
                        <avgraphedge source=cluster1 target=cluster2>
                        <avgraphedge source=cluster3 target=cluster2>
                        <avgraphedge source=cluster2 target=cluster3>
                        <avgraphedge source=cluster3 target=finish>
                </avgraph>
        <structure>
        ...
</scene>
```

FIG.39

DATA DESCRIBING METHOD AND DATA PROCESSOR

TECHNICAL FIELD

The present invention relates to a data describing method for describing a feature data characteristic of the content of an input data. The present invention also relates to a data processor for generating such a feature data. Further the present invention relates to a data processor in which such a feature data is utilized.

BACKGROUND ART

It is often desired to search, for playback, a desired part of a video application composed of a large amount of different video data, such as a television program recorded in a video recorder, for example.

As a typical one of the image extraction techniques to extract a desired visual content, there has been proposed a story board which is a panel formed from a sequence of images defining a main scene in a video application. Namely, a story board is prepared by decomposing a video data into so-called shots and displaying representative images of the respective shots. Most of the image extraction techniques are to automatically detect and extract shots from a video data as disclosed in "G Ahanger and T. D. C. Little: A Survey of Technologies for Parsing and Indexing Digital Video, Journal of Visual Communication and Image Representation 7: 28-4, 1996", for example.

It should be noted that a typical half-hour TV program for example contains hundreds of shots. Therefore, with the above conventional image extraction technique of G. Ahanger and T. D. C. Little, the user has to examine a story board having listed therein enormous shots having been extracted. Understanding of such a story board will be a great burden to the user. Also, a dialogue scene in which for example two persons are talking will be considered here. In the dialogue, the two persons are alternately shot by a camera each time either of them speaks. Therefore, many of such shots extracted by the conventional image extraction technique are redundant. The shots contain many useless information since they are at too low level as objects from which a video structure is to be extracted. Thus, with the conventional video structure extraction technique, the users cannot easily extract such shots.

That is to say, for the user's convenience in the video structure extraction, the conventional video structure extraction technique should be adapted to capture video structures at different levels including higher levels than the shots in accordance with the content of a video data. However, such a video structure extraction is very complex, so that an apparatus intended for extraction of such video structures should have a high capability of data processing and a large volume of computation resources. Thus, because of great costs and labor which would be required for such resources and data processing jobs, it is very difficult to implement such a function of video structure extraction in home video appliances.

DISCLOSURE OF THE INVENTION

Accordingly, the present invention has an object to overcome the above-mentioned drawbacks of the prior art by providing a data describing method for use with a variety of video data to provide a highly advanced browsing of the content of a video data and describe video structure data acquired by automatic content analysis of the video data. Also the present invention has another object to provide a data processor to generate such video structure data based on the automatic analysis of video data content. The present invention has a further object to provide a data processor for use in home video appliances among others to permit easy and private access to the content of a video data using such video structure data.

The above object can be attained by providing a signal describing method for describing a feature data characteristic of the content of an input data, wherein a descriptor being a unit element defining a describing procedure is structured to have its attribute defined as lower-level element and may include other descriptor as attribute.

The above data describing method according to the present invention permits to provide a structured description of the feature data using a set of structured descriptors.

Also the above object can be attained by providing a data processor for generating a feature data characteristic of the content of an input data, including means for generating a feature data on the basis of a descriptor being a unit element defining a describing procedure and which is structured to have its attribute defined as lower-level element and may include other descriptor as attribute.

The above data processor according to the present invention generates a structured feature data using a set of structured descriptors.

Further the above object can be attained by providing a data processor for utilizing a feature data characteristic of the content of an input data, including means for restoring a feature of the content of the input data by utilizing the feature data generated on the basis of a descriptor being a unit element defining a describing procedure and which is structured to have its attribute defined as lower-level element and may include other descriptor as attribute.

The above data processor according to the present invention restores the content of the input data on the basis of the feature data.

BRIEF DESCRIPTION OF THE DRAWINGS

FIG. 3 shows a description format for a descriptor.

FIG. 5 shows a description format for an AV element as descriptor.

FIG. 6 shows a description format for an AV segment as descriptor.

FIG. 7 shows a description format for an AV abstract as descriptor.

FIG. 8 shows a description format for an AV prototype as descriptor.

FIG. 10 shows a description format for a hierarchy as descriptor.

FIG. 11 shows a description format for a cluster as descriptor.

FIG. 15 shows a description format for an AV graph as descriptor.

FIG. 17 shows a description format for an AV graph as descriptor.

FIG. 18 shows a description format for a signature as descriptor.

FIG. 19 shows a description format for a temporal signature as descriptor.

FIG. 20 shows a description format for an activity level as descriptor.

FIG. 21 shows a description format for a weight level as descriptor.

FIG. 22 shows a description format for a concept as descriptor.

FIG. 23 shows a description format for a synopsis as descriptor.

FIG. 24 shows a description format for a color as descriptor.

FIG. 25 shows a description format for a color space as descriptor.

FIG. 26 shows a description format for a color signature as descriptor.

FIG. 27 shows a description format for an audio frame as descriptor.

FIG. 28 shows a description format for a visual frame as descriptor.

FIG. 29 shows a description format for a browsing node as descriptor.

FIG. 30 shows a description format for a shot as descriptor.

FIG. 31 shows a description format for a scene as descriptor.

FIG. 32 shows a description format for a program as descriptor.

FIG. 39 shows an example of the description of a scene as feature data.

BEST MODE FOR CARRYING OUT THE INVENTION

The embodiment of the present invention will further be described below with reference to the accompanying drawings.

The present invention is embodied as a data transmitter-receiver system including a transmitter used in a broadcasting station or the like to supply a multimedia content such as video data composed of visual and audio data, and a receiver to receive, for processing, a multimedia content from a transmitter such as a digital video recorder, home server or the like. The data transmitter-receiver system is assumed herein to deal with video data as multimedia contents. Before proceeding to the detailed description of the data transmitter-receiver system, a video data, as a multimedia content, to which the present invention is applicable will be described herebelow.

Figure 1:
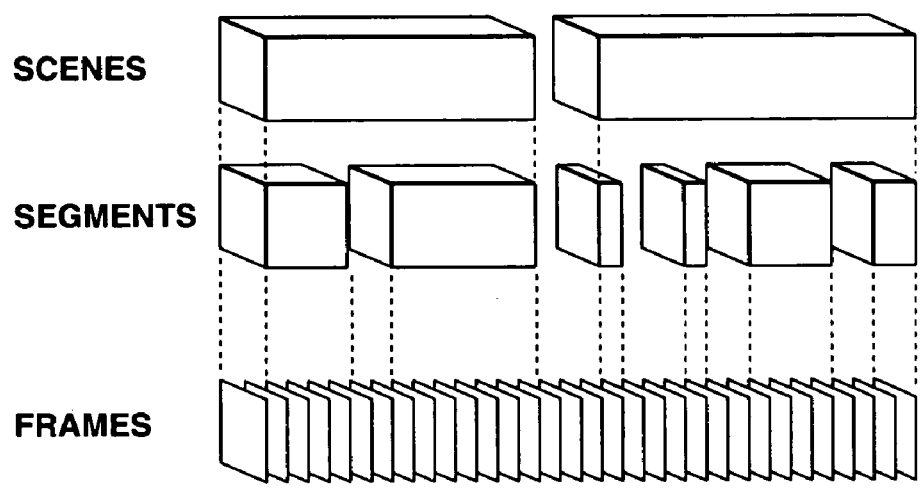
FIG. 1 explains the structure of a video data to which the present invention is applicable, using a video data model.

Referring now to FIG. 1, there is shown a video data model having a hierarchy having three levels such as frames, segments, scenes and a program. The present invention is applicable to such a video data. As seen, the video data model includes a sequence of frames at the lowest level. Also the video data model includes a sequence of consecutive segments at a level one step higher than the level of the frames. Further, the video data model includes scenes at the highest level. That is, a video data is formed from the scenes each consisting of the segments grouped together based on a meaningful relation between them. In addition, the video data includes a higher level at which there is laid a program (not shown) formed by grouping together related scenes.

Generally, the video data includes both visual information and audio information. That is, the frames in the video data include visual frames each being a single still image, and audio frames representing audio information having generally been sampled for a time as short as tens to hundreds of milliseconds.

As in the video data model, each of segments is comprised of a sequence of visual frames having consecutively been picked up by a single camera. Generally, the segment is called "shot". The segments include visual segments and/or audio segments, and each segment is the fundamental unit of a video structure. Especially, the audio segments among these segments can be defined in many different manners as will be described below by way of example. First, audio segments are bounded by periods of silence, respectively, in a video data detected by the well-known method, as the case may be. Also, in some cases, each audio segment is formed from a sequence of audio frames classified in several categories such as speech, music, noise, silence, etc. as disclosed in "D. Kimber and L. Wilcox: Acoustic Segmentation for Audio Browsers, Xerox Parc Technical Report". Further, in other cases, the audio segments are determined based on an audio cut point which is a large variation of a certain feature from one to the other of two successive audio frames, as disclosed in "S. Pfeiffer, S. Fischer and E. Wolfgang: Automatic Audio Content Analysis, Proceeding of ACM Multimedia 96, November 1996, pp 21–30", for example.

Further, to describe the content of a video data at a higher level based on its semantics, the scene is made up of a meaningful group of features of segments such as perceptual activities in the segments acquired by detecting visual segments (shots) or audio segments.

Moreover, the program represents a list of semantically related scenes. In particular, the program includes a movie, ordinary TV program, news program, sports hookup, etc.

Figure 2:
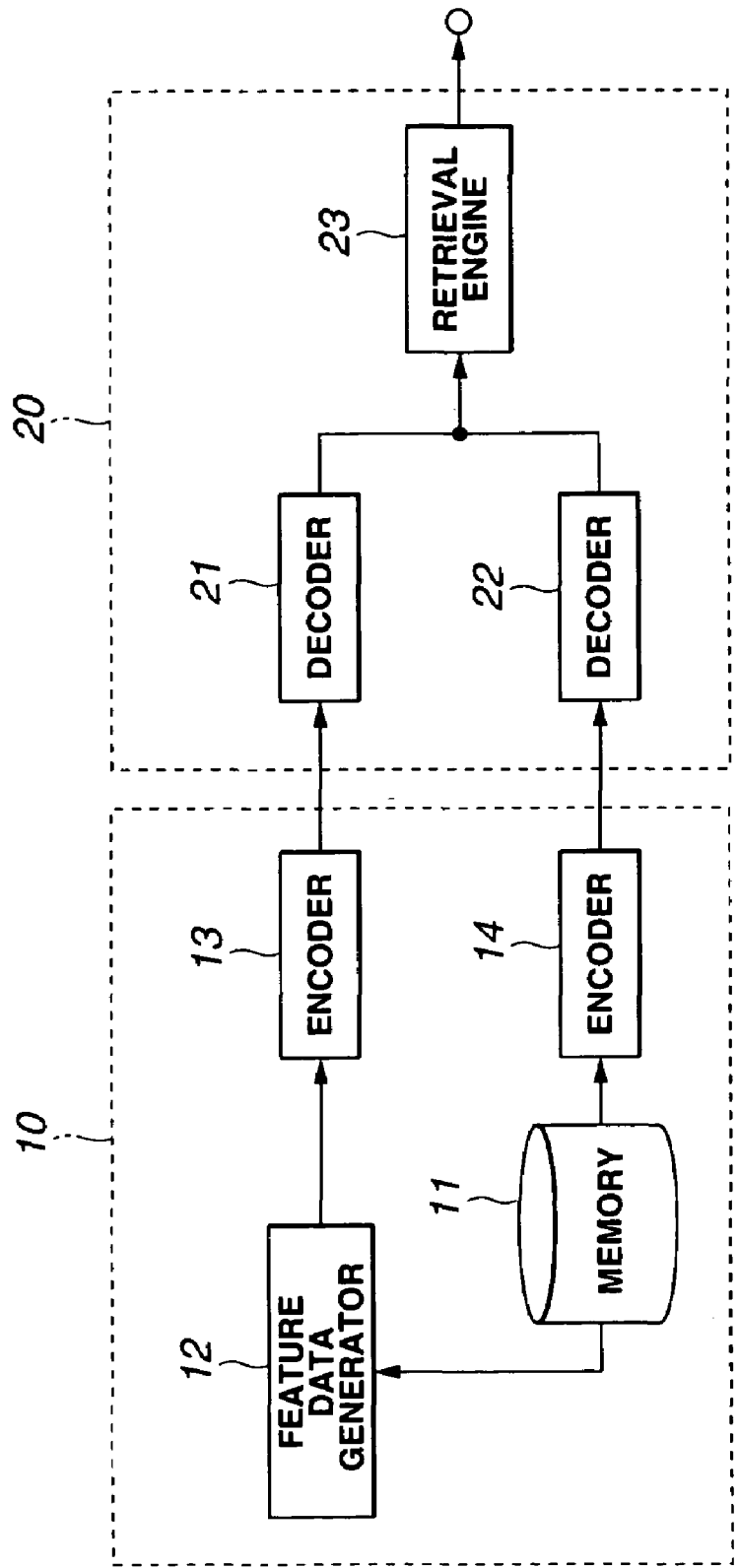
FIG. 2 is a block diagram of an embodiment of the data transmitter-receiver system according to the present invention.

Referring now to FIG. 2, there is schematically illustrated in the form of a block diagram the data transmitter-receiver system according to the present invention. The data transmitter-receiver system includes a transmitter 10 to supply a variety of data such as the aforementioned video data as multimedia contents, and a receiver 20 to receive the various data such as video data from the transmitter 10.

As shown in FIG. 2, the transmitter 10 includes a memory 11 to store the aforementioned video data, a feature data generator 12 to generate a feature data characteristic of the content of the video data supplied from the memory 11 and describing the video structure and the like, an encoder 13 to encode the multimedia content supplied from the memory 11, and an encoder 14 to encode the feature data supplied from the feature data generator 12.

As shown in FIG. 2, the receiver 20 includes a decoder 21 to decode the encoded multimedia content supplied from the transmitter 10, a decoder 22 to decode the encoded feature data supplied from the transmitter 10, and a retrieval engine 23 being a restoring means to analyze the video structure based on the feature data and provide a desired content to the user.

In the data transmitter-receiver system, the transmitter 10 generates a feature data describing the video structure of a video data held in the memory 11, and sends it along with the video data to the receiver 20 via a transmission path (not shown). Based on the received feature data, the receiver 20 restores the video structure of the received video data and generate a story board being a data which makes it possible to browse a sequence of frames representative of each of the aforementioned scenes for example.

Thus, in the data transmitter-receiver system, when supplied via the retrieval engine 23 with a request for viewing a desired content of the video data from the user, the receiver 20 can analyze the video structure of the restored video data by the retrieval engine 23 and provide the desired data to the user. Thus, the user can easily and privately access to the video data and make an efficient browsing.

A described content of a feature data for use to extract high-lever video structure using a lower-level element feature extracted from the content of a video data will further be described below.

First, a feature item necessary to describe the video structure or the like of a video data will be referred to as "descriptor", and a structured set of such descriptors will be referred to as "description scheme". In the present invention, the description scheme is composed of a video core description scheme (will be referred to as "VCS" hereinafter) which is used to describe a basic structure of a video data based on both visual and audio features of a video data, and a video browsing description scheme (will be referred to as "VBS" hereinafter) which is intended to extend VCS by a descriptor necessary to visualize the video structure, especially for browsing of the video data.

VCS is used to capture a variety of video structure in video data, and it permits to describe structures of visual segments and audio segments in the video data and correlation between these structures. In VCS, there are compatibly integrated in a single description scheme description schemes for describing three different structures including a similarity segment structure formed by combining segments similar to each other in the video data, temporal segment structure being a set of temporally consecutive segments, and a logical segment structure based on a logical relation between segments. Further, VCS enables to describe video structures at different levels of a video data, ranging from a lower-level element structure to a semantic structure. That is, VCS permits access to various information on a structured video data at different detailed levels of the video data.

On the other hand, VBS reconstructs a video data logically, permitting the user to understand the content of the video data and find points of interest to him or her. Also, VBS enables to retrieve not only lower-level element structures such as frames but also high-level structures such as scenes on the basis of the similarity.

In the present invention, the descriptor is a structure having a plurality of attributes and which is formed by defining other descriptors including itself and/or special attribute as lower-level element. The descriptors used in the present invention will be described hereinbelow using a description format shown in FIG. 3. In the description format shown, "Descriptor" denotes the name of a descriptor in consideration, "Superclass" denotes the name of a descriptor in a higher class than the descriptor in consideration, "Feature" denotes the name of a descriptor and/or attribute as lower-level element, and "Feature Type" denotes the data type of the feature. It should be noted that a numerical value of a feature as lower-level element is given as "Example Value" as necessary in the description format.

The higher-class descriptor denoted as the Superclass refers to an original descriptor the descriptor in consideration inherits from in a so-called object-oriented expression. That is, in the present invention, the descriptor is described by the object-oriented expression and the lower-class descriptor will inherit functions from a higher-class descriptor. Thus, such descriptors can easily be extended to ones having higher functions so that a feature data described using the descriptor can be structured more easily. The relation of inheritance between all the descriptors in the present invention is shown in FIG. 4.

Figure 4:
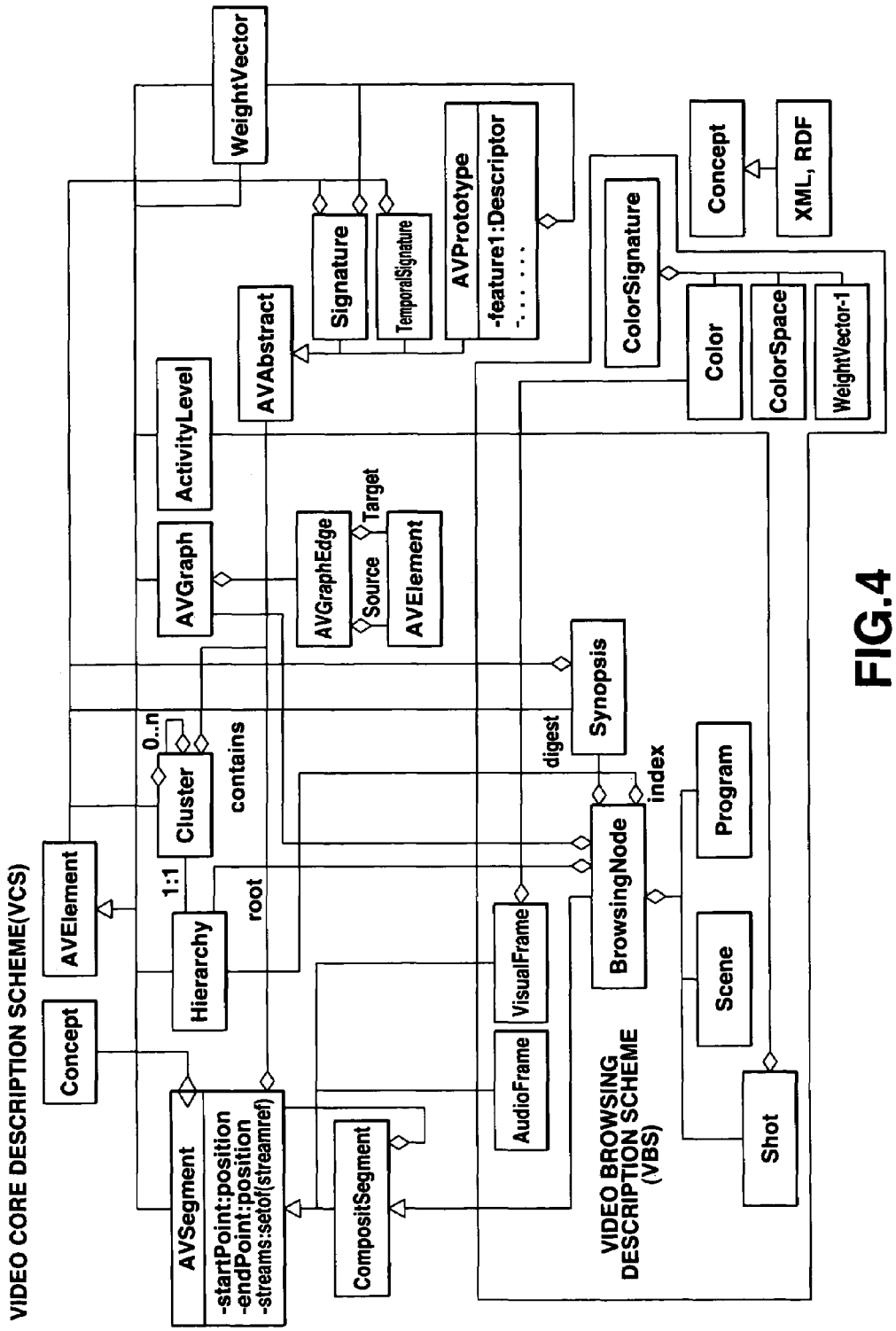
FIG. 4 shows an inheritance system for the descriptor.

As shown in FIG. 4, all the descriptors in the present invention belong to any of VCS or VBS which is an extended description scheme of VCS, and form together a single system.

More specifically, the descriptors belonging to VCS include audio-visual element (AVElement hereafter), audio-visual segment (AVSegment hereafter), audio-visual abstract (AVAbstract hereafter), audio-visual prototype (AVPrototype hereafter), hierarchy, cluster, composite segment, audio-visual graph (AVGraph hereafter), audio-visual graph edge (AVGraphEdge hereafter), signature, temporal signature, activity level, weight vector, and concept. The concept can make reference to information XML and RDF.

On the other hand, the descriptors belonging to VBS include Synopsis, Color, Color Space, Color Signature, Audio Frame, Visual Frame, Browsing Node, Shot, Scene, and Program.

In FIG. 4, a descriptor with "Δ" is a high-class one in the relation of inheritance between descriptors, and a descriptor with "o" is a one which will give its attribute to a descriptor connected thereto. That is, in the relation between descriptors, AVSegment, AVAbstract, Hierarchy, Cluster and AVGraph inherit from AVElement. Also, the descriptor giving its attribute to AVGraph is AVGraphEdge. Also for other descriptors, descriptors from which the other descriptors inherit and those giving their attributes to the other descriptors can be specified as in the above.

These descriptors will be described one after another herebelow. It should be noted that in the following description, it is assumed that a video data consists of one visual data stream and one audio data stream. However, it should also be noted that the description schemes in the present invention can also be used for ordinary video data consisting of an arbitrary number of visual and audio data streams.

First, the AVElement as descriptor belonging to VCS will be described. This descriptor is an abstract one representing a logical unit intended for use to analyze the content of a visual-audio stream. Here the AVElement is defined to be a one which represents an arbitrary unit in the visual-audio stream, such as basic analysis unit like a visual frame, high-level structure unit like shot and scene, or a unit based on the classification method, such as all frames in which a certain actor or actress appears.

The description format for the AVElement as descriptor is as shown in FIG. 5. The AVElement as descriptor provides an abstract element intended for description of the content of a visual-audio stream. Namely, all the other descriptors belonging to VCS and describing some side aspects of the content of a visual-audio stream will inherit from the AVElement. For this AVElement, an actual video data or an abstract or analytic composition formed to describe the content of a video data may be designated as feature data.

Next, the AVSegment as descriptor will be described herebelow. This is the most important one of the descriptors belonging to VCS. The AVSegment is a partial cut of a video stream including at least one or more visual-audio streams, that is, a segment. This segment may be designated using common temporal information incidental to video data, or common frame numbers or the like assigned to video data.

The description format for the AVSegment as descriptor is as shown in FIG. 6. The AVSegment inherits from the AVElement as the higher-class descriptor. Also, the AVSegment has, as features denoting other descriptors or attributes as lower-level element elements, Start Point whose type is Position and which denotes the start point of the segment in the video data, End Point whose type is Position and which denotes the end point of the segment in the video data, Streams whose type is a set of "streamref" and which denotes reference to an object video data, Abstract whose type is a set of AVAbstract, which denotes a summed visual-audio content of the segment and whose Example Value is a key frame, and Concept whose type is a set of concepts, which denotes more than zero commentary which gives a conceptual content of the segment and whose Example Value is a reference to a structure-descriptive data based on RDF of the segment.

The AVSegment is not limited itself to any special detailed level of segments it deals with. Namely, the AVSegment can be used to denote segments at different detailed levels including from lower-level element segment such as single visual frame to high-level segment such as commercial in a TV program.

The minimum AVSegments in the visual and audio streams, respectively, will be referred to as "visual frame" and "audio frame", respectively, hereinafter. In the visual stream, the visual frame refers to a single still image as having previously been described. On the other hand, in the audio stream, the audio frame refers to a set of sufficiently analyzable sampled audio values, not to a single sampled audio value. In VCS, the visual and audio frames are dealt with as the most fundamental node of the AVSegment. Other examples of the AVSegment include further shots and scenes.

The Position in FIG. 6 is an arbitrary data type for representation of temporal information. The only requirement for the Position is that the Position should be a numerical scale enabling to measure a time duration and give a common time base to all streams in a video data. More specifically, the Position should be a measurement in seconds of a time from the beginning of a video data, for example. The Streamref in FIG. 6 is an arbitrary data type enabling to make reference to a single stream in a composite stream multimedia text.

Next, the AVAbstract as descriptor will be described herebelow. The description format for this AVAbstract is as shown in FIG. 7. As will be seen, this descriptor inherits from the AVElement which is a higher-class descriptor.

The AVAbstract as descriptor provides an abstract of the content of the AVElement. For example, when a lower-level AVElement representative of a certain AVElement (when this AVElement denotes a scene, for example, the lower-level AVElement will denote a shot) is selected, the lower-level AVElement will be an abstract of the certain AVElement as the case may be.

An abstract denoted by the AVAbstract as descriptor represents the content of the AVElement of which it is representative. In VCS, the most important use of this AVAbstract as descriptor is to enable to identify a destination AVElement just by comparing the abstracts of similar AVElements being retrieved with each other. That is, this abstract serves as a key for detection, comparison, retrieval, etc. of the AVElements.

Next, the AVPrototype as descriptor will be described herebelow. The description format for this AVPrototype is as shown in FIG. 8. As seen, this AVPrototype inherits from the AVAbstract which is the higher-class descriptor of the AVPrototype. The AVPrototype as descriptor is a Feature which denotes a descriptor or attribute as lower-level element. The Feature contains a Kind whose type is String and Sample Value is Shot, Scene or Visual Frame, and, as necessary, a plurality of features (Feature1, . . . , Featuren) whose type is an arbitrary descriptor and Weights whose type is Weight Vector and which indicates a weighting of the importance of a feature the AVPrototype has as lower-level element.

The AVPrototype outlines an object AVElement. In VCS, it is possible to describe the outline of an AVElement of a certain type as a set of descriptor values. In other words, a certain prototype element will outline an AVElement it denotes, by an arbitrary number of concrete elements or their analyses.

Figure 9:
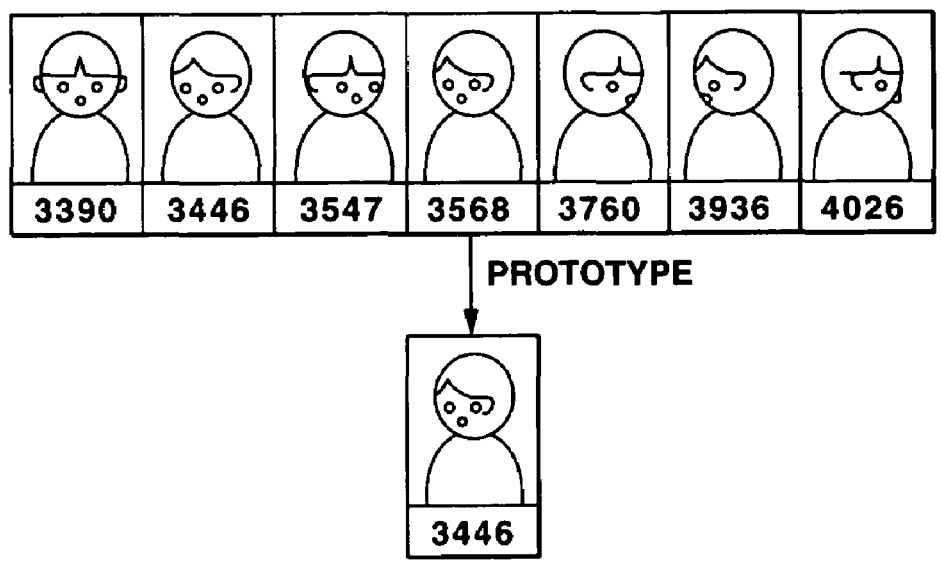
FIG. 9 shows a prototype.

As an example of the analyses, all images included in a single shot for example will be described with reference to FIG. 9. When it is desired to define a prototype image for this group of images, a mean-value image of all the images in the shot can be obtained in place of a certain image in the image group and used as a feature value in the prototype.

On the other hand, the AVPrototype as descriptor denotes a frame representative of segments used in structure analysis of a video data such as shots and scenes, in some cases. For example, the following can be done as will further be described later. Namely, features for visual frames denoted as an AVPrototype by a plurality of shots are extracted as features for the shots, and they are compared with each other to detect similar shots lying close to each other in time. By repeating this operation, shots are combined to generate a scene finally.

Next, the Hierarchy as descriptor will be described herebelow. The basic method for hierarchical structuring of a video data for retrieval based on the data content and browsing is to group together visual segments and audio segments in the video data that are similar to each other or related with each other. In VCS, using a hierarchical structure based on a tree, it is possible to group sets of visual segments and audio segments at different detailed levels in the hierarchical structure. The hierarchical structure provides the following features. The first feature is to enable to access to different detailed levels, and the second feature is to provide a content abstract at a higher level. The third feature is to provide a hierarchical classification method, and the fourth feature is to provide an approximate semantic classification method.

The description format for the Hierarchy as descriptor is as shown in FIG. 10. This descriptor inherits from the AVElement being the higher-class descriptor. Also, the Hierarchy has, as features denoting a descriptor or attribute of lower-level element, Root whose type is Cluster and which denotes a start point of the hierarchy, and Kind whose type is String and which denotes the kind of the hierarchy.

The Hierarchy as descriptor denotes a result of grouping a plurality of AVElements related with or similar to each other into one hierarchical structure.

Next, the Cluster as descriptor will be described herebelow. The description format for this descriptor is as shown in FIG. 11. This descriptor inherits from the AVElement in a higher class than itself Also, the Cluster has, as features denoting a descriptor or attribute as lower-level element, Members whose type is a set of AVElements and which denotes a plurality of AVElements included directly in the group, and Abstract whose type is AVAbstract and which denotes a typical member representative of the members included in the Cluster.

The Cluster as descriptor groups together AVElements related to or similar to each other to form one collection. This definition is recursive, and some clusters may include other clusters as members. In this case, the cluster group will form a hierarchical classification structure.

Figure 12:
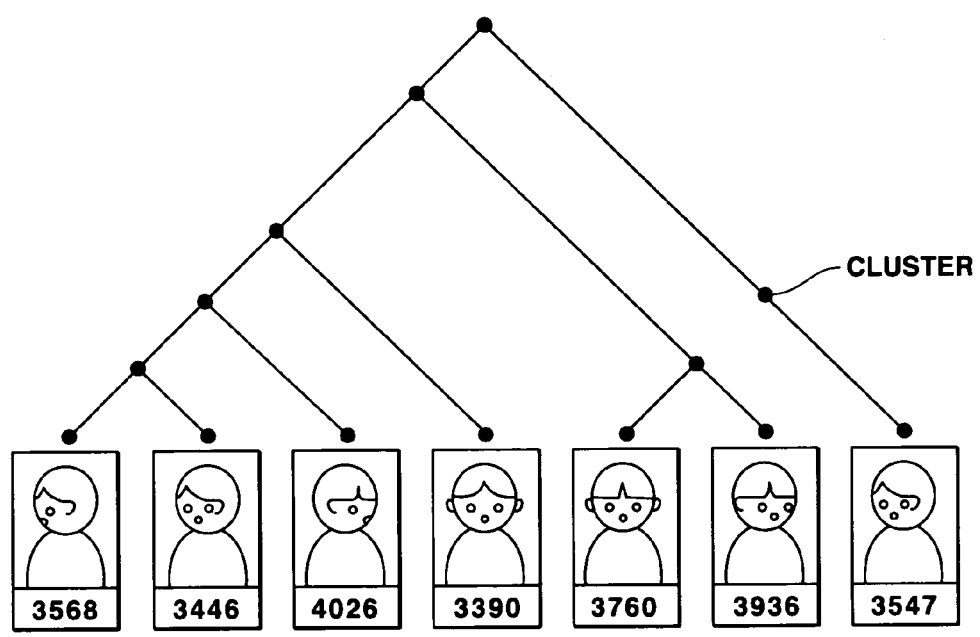
FIG. 12 shows a clustering.

Using the Cluster as descriptor, segments can be clustered based on the similarity between the segments as shown in FIG. 12, and the result of clustering can be described. More specifically, use of the Cluster as descriptor enables to cluster shots based on their similarity as will further be described later.

Many methods to form a tree structure based on the similarity have been proposed, including the agglomerative hierarchical clustering methods, etc. for example.

Next, the Composite Segment as descriptor will be described herebelow. The similarity-based hierarchical classification is independent of the temporal sequence of the segments. To provide a temporal hierarchical structure of a video data, the Composite Segment is introduced as a descriptor. The term "Composite" refers to a hierarchical structure formed from AVElement's arranged on the time based as shown in FIG. 13 for example.

Figures 13, 14:
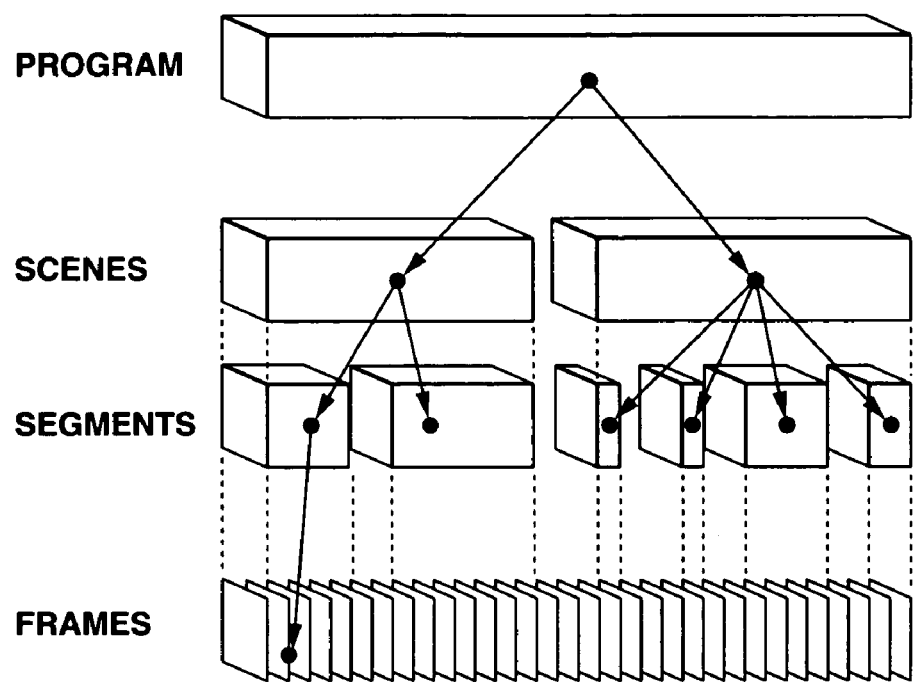
FIG. 13 shows a composite.
FIG. 14 shows a description format for a composite segment as descriptor.

The description format for the Composite Segment as descriptor is as shown in FIG. 14. This descriptor inherits also from the AVSegment being the higher-class descriptor. The Composite Segment has, as a descriptor or attribute as lower-level element, Components whose type is a set of SVSegment's. Note that the Composite Segment is a special AVSegment descriptor, and can describe how segmentation is repeated done by introducing the Components.

The Composite Segment as descriptor describes how a sequence of AVSegments on the time base is segmented into sub sequences similar to or related with each other. Using this Composite Segment as descriptor, it is possible to describe the structure of a video data as a tree structure on the time base. More specifically, use of the Composite Segment as descriptor makes is possible to describe as a scene a result of clustering of similar segments by grouping, and describe the structure of a video data as a whole as a tree structure by further clustering the scene.

Next, the AVGraph and AVGraphEdge as descriptors will be described herebelow. To capture the logical structure of a video data, the AVGraph is introduced. Note that the AVGraphEdge is defined as a graph edge in which each node denotes AVElement and an edge connecting the nodes denotes the relation between one AVElement and other AVElement.

As a set of GraphEdge's having labeled edges indicating different kinds of relations between A-VElement's, the AVGraph describes how the AVElements are connected to each other.

The description format for the AVGraph as descriptor is as shown in FIG. 15. This descriptor inherits from the AVElement in the higher class. Also, the AVGraph as descriptor has, as features denoting a descriptor or attribute as lower-level element, Edges whose type is a set of AVGrahEdge's and which denotes AVGraphEdge's forming the AVGraph, and Kind whose type is String and which denotes the kind of the AVGraph.

Figure 16A:
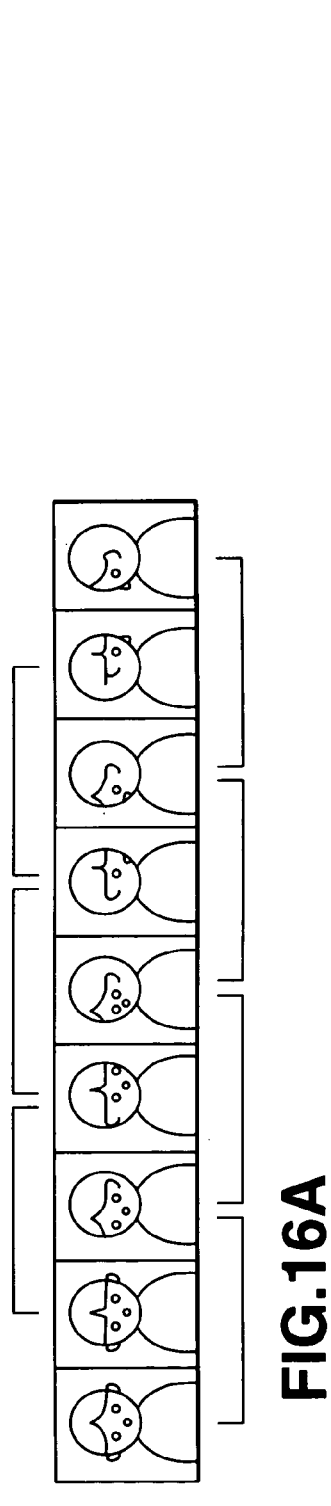
FIG. 16A shows a sequence of shots forming together a dialogue scene.
Figure 16B:
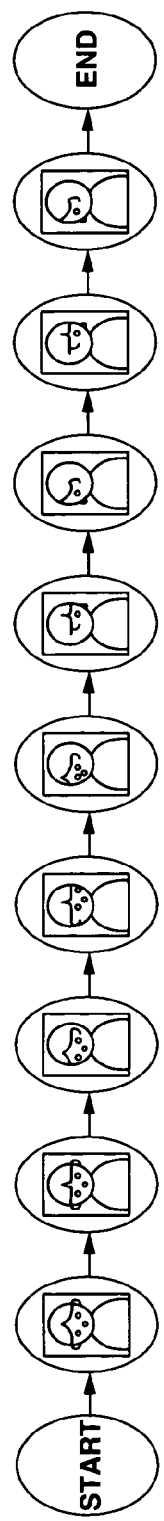
FIG. 16B shows an AV graph depicting a linear structure of the series of shots in FIG. 16A.
Figure 16C:
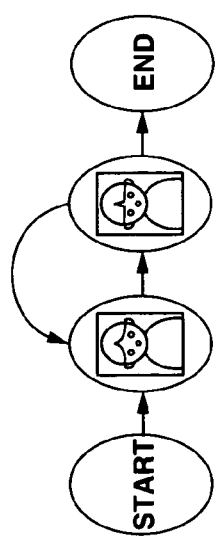
FIG. 16C shows an AV graph depicting a semantics of the series of shots in FIG. 16A.

The AVGraph as descriptor makes it possible to describe a repeated structure of a video data. More specifically, using the AVGraph as descriptor to describe the content of detected scenes as a repeated structure of the scenes, it is possible to analyze the entire structure of the video data. By way of example, two different AVGraph's in a sequence of shots forming a dialogue scene as shown in FIG. 16A, are shown in FIGS. 16B and 16C. The example shown in FIG. 16B depicts a simple linear structure, while that shown in FIG. 16C depicts a semantic structure having as a feature the shots of two speakers, alternating when either of them talks.

On the other hand, the description format for the AVGraphEdge as descriptor is as shown in FIG. 17. The AVGrapEdge as descriptor has, as features denoting a descriptor or attribute as lower-level element, Source whose type is AVElement and which denotes that the descriptor is the start-point element of the edge, Target whose type is AVElement and which denotes that the descriptor is the end-point element of the edge, and Label whose type is String and which indicates the kind of the relation between elements connected to the edge.

The AVGraphEdge as descriptor indicates the directed connection between two AVElement's.

All the AVGraphEdge's belong to a certain AVGraph. Also, the same AVElement's belong to different AVGraph's, respectively, as th case may be. Further, the same AVElement's are connected to each other while belonging to different AVGraph's, respectively.

Note that in the definition of the AVGraph, no special constraints are imposed upon the type of AVElements to which the node can make a reference. That is, the node can make a reference to the AVPrototype also. In this case, the AVGraph will be referred to as "AVPrototypeGraph", indicating the prototype of the video data structure. Such a structure can be used to represent a structure in a TV news program for example.

Also, the AVGraph allows the nodes in one graph to form an AVGraph having a nested structure which indicates another collection of graphs. Thereby the AVGraph enables to capture structures represented at different levels.

Next, the Signature as descriptor will be described herebelow. The description format for the Signature as descriptor is as shown in FIG. 18. The Signature inherits from the AVAbstract in the higher class than the Signature. Also, the Signature has, as features denoting a descriptor or attribute as lower-level element, Weights whose type is WeightVector, Members whose type is a set of AVElement's and weighting is indicated as one to one by Weights, and Kind whose type is String and which denotes kind of the Signature. Note that the comparison between Signature's can validly be effected only when the Kind's are equal to each other.

The Signature as descriptor indicates representatively the static contents of the AVElement's by combinations of a plurality of representative AVElements and Weights of their respective elements.

A first example of the Signature is Shot Key Frames. The Shot Key Frames is a plurality of frames representative of shots extracted from the contents. The weight of each key frame is an index indicating how important each key frame is in a representative frame of the shot.

A second example of the Signature is Program Signature. The Program Signature is a set of shots indicating definitely the features of a certain program. For a news program, for example, a shot in which the opening logo mark appears, shot of the newscaster, shot of the last logo mark, etc. can be used as best representing the features of the news program.

Next, the Temporal Signature as descriptor will be described herebelow. The description format for the Temporal Signature is as shown in FIG. 19. As seen, the Temporal Signature inherits from the AVAbstract in the higher class than the Temporal Signature. The Temporal Signature has, as features denoting a descriptor or attribute as lower-level element, Time whose type is WeightVector and which denotes a relative time duration of each partial AVElement in an object AVElement, Members whose type is a sequence of AVElement's which is a sequence on the time base of partial AVElement's representative of the object AVElement, and Kind whose type is String and which denotes a kind of the Temporal Signature. Note that the comparison between the Temporal Signature's can validly be done only when the Kinds are equal to each other.

Such a Temporal Signature as descriptor indicates representatively the dynamic content of the object AVElement the Temporal Signature is directed to by a sequence of a plurality of representative partial AVElement's being members of the Temporal Signature. Note that each partial AVElement is given a weighting factor which depends upon a relative time duration thereof.

Note that the number of necessary partial AVElement's for representing the object AVElement depends upon both the extent of dynamic change of the AVElement itself and the detail of a required content. For example, when the change of an AVElement in consideration is very small, the AVElement may be represented by one partial AVElement. On the other hand, if the AVElement in consideration changes violently, many partial AVElement's are required for accurate description of the change.

A first example of the Temporal Signature is Shot Temporal Signature. It is a list of a plurality of key frames by which a shot can be characterized.

A second example of the Temporal Signature is Television Program Temporal Signature. This is a set of key shots extracted from a program and characteristic of the program. In case of news program, for example, a shot of a representative logo mark, shot of the newscaster, shot of sports, weather forecast, etc. can be used as best characterizing the news program.

Note that the aforementioned Signature and this Temporal Signature are bot composed of weighted partial AVElement's. However, different from the Signature, the temporal Signature has members thereof ordered in time. That is, the Temporal Signature describes a sequence of partial AVElement's included therein and which will be presented as the time elapses. It should be noted that the weighting factor is an index indicating how much time each of the AVElement's requires.

Next, the Activity Level, Weigh Vector and Concept as other descriptors will be described herebelow.

The description format for the Activity Level as descriptor is as shown in FIG. 20. As seen, this descriptor has, as features denoting a descriptor or attribute as lower-level element, ActivityLevel whose type is Real (real number of larger than 0 and smaller than 1; 0 indicates that there is no activity while 1 indicates the activity is maximum).

The ActivityLevel as descriptor denotes an extant of the activity of an AV object in the AVElement. Note that the method for generating the ActivityLevel as descriptor depends upon an intended application.

Visual segments will be considered here. The activity level in the visual segments can be measured by various methods. For example, the activity level can be determined by measuring a mean distance of a visual object between adjacent frames in a segment, entire motion or momentum taking place in the segment, etc.

With the Activity Level, it is possible to describe visual and audio features as will further be described later. That is, the Activity Level as descriptor can be used as a parameter for measurement of how much the content of a video data changes.

The description format for the Weight Vector is as shown in FIG. 21. As seen, this descriptor has, as features denoting a descriptor or attribute as lower-level element, Weights whose type is a real-number n-dimensional vector (Real [n]), and Normalized whose type is Boolean and which is a flag indicating whether or not a value included in the Weights is a normalized. Note that the Weights may be constrained.

The Weight Vector as descriptor denotes an n-dimensional vector of a weighting factor applied to the AVElements. With this Weight Vector, it is possible to designate weighting of a parameter obtained as a result of feature extraction from a video data.

Further, the description format for the Concept as descriptor is as shown in FIG. 22. As seen, the Concept has, as features denoting a descriptor or attribute as low-element, Concept whose type is a node or the like indicating a reference to data described in RDF or XML.

With this Concept as descriptor, it is possible to combine the AVElement to a data which describes the conceptual contents of the AVElement. In VCS, no special means is designated for the description of such conceptual contents.

Next, a group of descriptors belonging to VBS which is an extension or inheritance of VCS will be described herebelow.

As a descriptor belonging to VBS, the Synopsis will be described herebelow. A descriptor which provides a video abstract for browsing a video data will be described as the Synopsis. The Synopsis is intended to make a synopsis of the content of a certain video data and then describe AVElement's used to present to the audience the synopsis in a visual or audio manner or in both.

The description format for the Synopsis as descriptor is as shown in FIG. 23. As seen, the Synopsis inherits from the AVElement in the higher class than the Synopsis. The Synopsis has, as features denoting a descriptor or attributed as lower-level element, Kind whose type is String and which indicates the kind of the Synopsis, Sequence whose type is a list of AVElement's and which indicates a list of AVElement's forming together the Synopsis, and IsOrdered whose type is Boolean and which is a flag indicating whether the order of the AVElement's in the sequence is important or not.

The Synopsis as descriptor denotes a set of AVElement's to be displayed when presenting the synopsis to the user.

Apparently, the AVAbstract and Synopsis seem to present the same information. However, there is a large difference between the AVAbstract and Synopsis. Namely, the Synopsis is to summarize the AVElement's for the user while the AVAbstract is to summarize for retrieving or indexing audio and visual segments.

First example of the supposed Synopsis is a set of Key frames. This is a group of frames orders to summarize the outline of AVElements.

A second example is Digest. This is a group of AVSegment's ordered to present the synopsis of the AVElement's, for example, a list of clips extracted from a video data.

With the Synopsis as descriptor, it is possible to understand the output of video data content. More specifically, the Synopsis enables to represent a detected scene by a representative frame in the scene and display it as a story board.

Next, the Color as descriptor will be described herebelow. The description format for the Color is as shown in FIG. 24. As seen, the Color has, as features denoting a descriptor or attribute as lower-level element, Color whose type is a real-number n-dimensional vector (Real [3]) and which indicates a color element value of which each element is represented in a range of larger than 0 and smaller than 1.

The Color as descriptor describes a color with three different real numbers.

Next, the Color Space as descriptor will be described herebelow. The description format for the Color Space is as shown in FIG. 25. As seen, the Color Space has, as features denoting a descriptor or attribute as lower-level element, ColorSpace whose types is String and which indicates a color space name.

Note that one color can be encoded with different color spaces. Thereby, in VBS, the Color Space as descriptor can be used to determine how the meaning of the Color as descriptor should be interpreted.

Next, the ColorSignature as descriptor will be described herebelow. The description format for the ColorSignature is as shown in FIG. 26. As seen, the ColorSignature has, as features denoting a descriptor or attribute as lower-level element, ColorSpace whose type is ColorSpace and which indicates a color space from which the ColorSpace as descriptor is calculated, Colors whose type is a color-type vector (Color [n]) and which indicates a set of colors with which the Signature is defined, and Weights whose type is WeightVector and which indicates a weighting of the Signature of each Colors.

The ColorSignature as descriptor denotes a generalized color histogram. Conceptually, the histogram can be regarded as depicting a classification of a color into some categories and a frequency of appearance in the categories of pixels in a certain image. The ColorSignature enables to generalize this method and set an arbitrary bin (minimum divisional area in a color space). Note that each bin is represented by a representative color in the minimum divisional area.

Assume here for example that a certain color image is given and it is desired to describe colors used in the image as ColorSignature. First, a color space depicting a color is divided into some areas. Next, pixels in the image are classified into color areas, respectively. A relative ratio of the pixel appearance frequency obtained as the result will be Weights.

Next, audio frame, visual frame, browsing node, sot, scene and program will be described as structure descriptors. As having previously been described, a video data is organized as a four-storied hierarchy. Namely, the four stories or levels are frames, (audio and visual frames), segments, scenes and a program.

The description format for the audio frame as descriptor is as shown in FIG. 27. The audio frame as descriptor inherits from the AVSegment in the higher class than the audio frame. The audio frame has, as features denoting a descriptor or attributes as lower-level element, features enabling to describe a spectrum of audio frames and arbitrary features related with description, analysis, etc. of audio information (not shown in FIG. 27).

The audio frame as descriptor denotes an AVSegment corresponding to a single audio frame.

On the hand, the description format for the visual frame as descriptor is as shown in FIG. 28. The visual frame as descriptor inherits from the AVSegment in the higher class.

The visual frame as descriptor has, as features denoting a descriptor or attribute as lower-level element, Color whose type is ColorSignature and which indicates the color characteristic of the frame.

The visual frame as descriptor is used in a special case of the AVSegment to depict a single visual frame.

The description format for the browsing node is as shown in FIG. 29. The browsing node inherits from the CompositeSegment in the higher class. The browsing node has, as features denoting a descriptor or attribute as lower-level element, Index whose type is a set of AVHierarchy and which indicates a set of hierarchical classification used to index the content of the AVSegment using the underlying sub elements and Sample Value is a classified hierarchical structure of a video data by way of example, Synopsis whose type is a set of AVSynopsis and which indicates a synopsis of a certain part of the video data and Sample Value is a list of key frames by way of example, and Structure whose type is AVGraph and which indicates a structure of the certain part of the video data.

The browsing node as descriptor is in a common abstract class to provide units of various video structures used in browsing.

A descriptor inheriting from this browsing node can be used to describe he content of a video data in detail. These descriptors will be described one after another herebelow.

First, the shot as descriptor will be described. The description format for the shot is as shown in FIG. 30. The shot as descriptor inherits from the browsing node in the higher class. The shot has, as features denoting a descriptor or attribute as lower-level element, Activity whose type is ActivityLevel and Sample Value is 0.5 for example, Abstract whose type is From AVSegment inheriting from the AVSegment and which indicates the abstract of the content of the shot, Synopsis whose type is FromBrowsingNode inheriting from the browsing node and which indicates the synopsis-type abstract composed of a list of audio and/or visual frames, and Index whose type is FromBrowsingNode inheriting from the browsing node and which indicates an index to the shot composed as a classified structure of audio and/or visual frames. Note that of these features, Index may not always be designated. The Abstract enables to give the following content abstract to the shot. A first content abstract is a one formed from audio frame, visual frame and AVPrototype using the TemporalSignature, and a second content abstract is a one formed from audio and visual frames using the Signature.

The shot as descriptor denotes a lowest level of the audio-visual unit, namely, a shot.

Next, the scene as descriptor will be described. The description format for the scene is as shown in FIG. 31. The scene as descriptor inherits from the browsing node in the higher class. The scene as descriptor has, as features denoting a descriptor or attribute as lower-level element, Kind whose type is String, which indicates the kind of an object scene and whose Sample Value is DIALOG, COMMERCIAL, ACTION or ANCHOR, Abstract whose type is FromAVSeg ent inheriting from the AVSegment and which indicates the abstract of the content of the shot, Synopsis whose type is FromBrowsingNode inheriting from the browsing node and which indicates the synopsis-type abstract composed of a list of audio and/or visual frames, Index whose type is FromBrowsingNode inheriting from the browsing node and which indicates an index to the shot composed as a classified structure of audio and/or visual frames, and Structure whose type is FromBrowsingNode inheriting from the browsing node, in which the node indicates a cluster of similar shots for example and the link indicates an AVGraph which depicts a transition between clusters. Note that the Abstract enables to give the scene the following content abstract. Namely, the content abstract is a one formed from shots or AVPrototype using the Signature or TemporalSignature as descriptor.

The scene as descriptor denotes a scene being a set of shots semantically related to each other.

Further, the program as descriptor will be described. The description format for the program as descriptor is as shown in FIG. 32. The program as descriptor inherits from the browsing node as descriptor. Also, the program as descriptor has, as features denoting a descriptor or attribute as lower-level element, Abstract whose type is FromAVSegment inheriting from the AVSegment and which indicates the abstract of the content of the shot, Synopsis whose type is FromBrowsingNode inheriting from the browsing node and which indicates the synopsis-type abstract composed of a list of audio and/or visual frames, Index whose type is FromBrowsingNode inheriting from the browsing node and which indicates an index to the shot composed as a classified structure of audio and/or visual frames, and Structure whose type is FromBrowsingNode inheriting from the browsing node, in which the node indicates a cluster of similar shots for example and the link indicates an AVGraph which depicts a transition between clusters. The Abstract enables to give the program the following content abstract. Namely, a first content abstract is a one made of scenes using the Signature or TemporalSignature as descriptor, and a second content abstract is a one made of shots using the Signature or TemporalSignature as descriptor. The Index to the program is formed from an index for various levels such as hierarchical index to all shots and/or hierarchical index to all scenes.

The program as descriptor denotes a program composed of a list of scenes.

With VBS composed of a set of aforementioned descriptors, it is possible to structure at various detailed levels audio-visual indices to a hierarchically structured video data using information included in the indices in various browsing nodes. For example, the program as descriptor enables to organize, for all shots included in a video data, a hierarchical structure classed based on the similarity between the shots. Thus, when it is desired to display information whose level is higher than a certain detailed level, the hierarchical structure should be divided into upper and lower blocks at the detailed level and only the upper structure be used. Further, by selecting members representing each group of AVElements in each node at the dividing detailed level from the group and displaying them one after another, it is possible to provide an outline of the program at the detailed level.

In VBS, use of a synopsis related to each level of a hierarchical video structure makes it possible to display of an audio-visual table of contents of the video data. For example, when there is a synopsis as shown in Table 1 at each level and it is desired to display the synopsis as a table of contents, extraction of key frames at each level from representative key frames of each shot makes it possible to provide an audio-visual table of contents.

TABLE 1

Synopsis for levels of video structure

| Level | Synopsis |
| --- | --- |
| Shot | Sequence of key frames |
| Scene | Sequence of key shots |
| Program | Sequence of key scenes |

Concrete operations for extraction of a structure from a video data and feature data with which a video structure or the like is described using a describing procedure defined as the aforementioned description scheme, will be described herebelow. Note that the operations for extraction of a structure from a video data can be effected by both the transmitter and receiver 20 in the data transmitter/receiver system having previously been described. Extraction of a scene structure from a video data by the transmitter 10; generation of feature data corresponding to the scene structure, and transmission of the feature data with the video data to the receiver 20, will be described hereinbelow.

Using the features for the visual segments and audio segments in the video data, the transmitter 10 measures a similarity between the segments and groups the segments into scenes, thereby automatically extracting a video structure. At this time, since repeated similar segments lying close to each other in time are parts of the generally same scene, the transmitter 10 detects the scenes by detecting and grouping such segments. The transmitter 10 effects a series of operations as outlined in FIG. 33 to detect scenes.

First at step S1 in FIG. 33, the transmitter 10 divides a video data into visual or audio segments as will be described below. More particularly, the transmitter 10 divides an input video data into visual or audio segments or possibly into both segments. The video segmenting method employed in the transmitter 10 is not any special one. For example, the transmitter 10 segments a video data by the method disclosed in the previously mentioned "G. Ahanger and T. D. C. Little: A Survey of Technologies for Parsing and Indexing Digital Video, Journal of Visual Communication and Image Representation 7: 28-4, 1996". This video segmenting method is well known in this field of art. The transmitter 10 according to the present invention can employ any video segmenting method.

Next at step S2, the transmitter 10 extracts a feature. More specifically, the transmitter 10 calculates a feature which characterizes the properties of a segment. In the transmitter 10, for example, a time duration of each segment, video or visual features such as color histogram and texture feature, audio features such as frequency analysis result, level and pitch, activity determination result, etc. are calculated as applicable features. Of course, the transmitter 10 according to the present invention is not limited to these applicable features.

Next at step S3, the transmitter 10 measures a similarity between segments using their features. More specifically, the transmitter 10 measures a dissimilarity between segments and determines how similar the two segments are to each other according to the feature similarity measurement. Using the features having been extracted at step S2, the transmitter 10 calculates a criterion for measurement of dissimilarity.

At step S4, the transmitter 10 groups the segments. More particularly, using the dissimilarity measurement criteria calculated at step S3 and features extracted at step S2, the transmitter 10 iteratively groups similar segments lying close to each other in time. Thus, the transmitter 10 provides a finally produced group as a detected scene.

With the above series of operations, the transmitter 10 can detect a scene from a video data. Therefore, using the above result, the user can sum the content of the video data and quickly access to points of interest in the video data.

The operation of the transmitter 10 at each of the steps shown in FIG. 33 will further be described below.

First the video segmentation at step S1 will be discussed herebelow. The transmitter 10 divides an input video data into visual or audio segments or into both segments if possible. Many techniques are available for automatic detection of a boundary between segments in a video data. As mentioned above, the transmitter 10 according to the present invention is not limited to any special video segmenting method. On the other hand, the accuracy of scene detection in the transmitter 10 substantially depends upon the accuracy of the video segmentation which is to be done before the scene detection. It should be noted that in the transmitter 10, the scene detection can be done even with some error in the video segmentation. In this transmitter 10, excessive segment detection is more preferable than insufficient one for the video segmentation. Namely, so long as excessive similar segments are detected, they can be grouped as those included in the same scene.

Next the feature detection at step S2 will be discussed herebelow. The features are attributes of segments, characterizing the properties of the segments and providing information according to which a similarity between different segments is measured. The transmitter calculates visual and audio features for each segment. However, the transmitter 10 is not limited to any special features. The features considered to be effectively usable in the transmitter 10 include visual feature, audio feature and visual-audio feature as will be described below. The requirement for these features usable in the transmitter 10 is that they should be ones from which a dissimilarity can be determined. For a higher efficiency of signal processing, the transmitter 10 simultaneously effects a feature extraction and video segmentation as the case may be. The features which will be described below meet the above requirement.

The features include first a one concerning an image (will be referred to as "visual feature" hereinafter). A visual segment is composed of successive visual frames. Therefore, an appropriate one of the visual segments can be extracted to characterize the content the visual segment depicts, by the extracted visual frame. Namely, a similarity of the appropriately extracted visual frame can be used as a similarity between visual segments. Thus, the visual feature is an important one of the important features usable in the transmitter 10. The visual feature can represent by itself only static information. Using a method which will be described later, the transmitter 10 can extract a dynamic feature of visual segments based on the visual feature.

The visual features include many well-known ones. However, since it has been found that color feature (histogram) and video correlation, which will be described below, provide a good compromise between the cost and accuracy of calculation for the scene detection, the transmitter 10 will use the color feature and video correlation as visual features.

In the transmitter 10, colors of images are important materials for determination of a similarity between two images. The use of a color histogram for determination of a similarity between images is well known as disclosed in, for example, "G. Ahanger and T. D. C. Little: A Survey of Technologies for Parsing and Indexing Digital Video, Journal of Visual Communication and Image Representation 7: 28-4, 1996". It should be noted that the color histogram is acquired by dividing a three-dimensional space such as HSV, RGB or the like for example into n areas and calculating a relative ratio of frequency of appearance in each area of pixels of an image. Information thus acquired gives an n-dimensional vector. Also, a color histogram can be extracted directly from a compressed video data as disclosed in the U.S. Pat. No. 5,708,767.

The transmitter 10 uses a 64-dimensional ($=2^{2 \cdot 3}$-dimensional) histogram vector acquired by sampling, at a rate of 2 bits per color channel, an original YUV color space in images forming a segment.

Such a histogram represents a total color tone of an image but includes no timing data. For this reason, a video correlation is calculated as another visual feature in the transmitter 10. For the scene detection in the transmitter 10, mutual overlapping of a plurality of similar segments is an important index indicating that the segments form together a scene structure. For example, in a dialogue scene, the camera is moved between two persons alternately and to one of them being currently speaking. Usually, for shooting the same person again, the camera is moved back to nearly the same position where he or she was previously shot. Since it has been found that for detection of such a scene structure, a correlation based on reduced grayscale images is a good index for a similarity between segments, initial images are thinned and reduced to grayscale images each of M×N (both M and N may be small values; for example, M×N may be 8×8) in size and a video correlation is calculated using the reduced grayscale images in the transmitter 10. That is, the reduced gray scale images are interpreted as an MN-dimensional feature vector.

The features different from the above-mentioned visual feature concern a sound. This feature will be referred to as "audio feature" hereinafter. The audio feature can represent the content of an audio segment. In the transmitter 10, a frequency analysis, pitch, level, etc. may be used as audio features. These audio features are known from various documents.

First, the transmitter 10 can make a frequency analysis of a Fourier Transform component or the like to determine the distribution of frequency information in a single audio frame. For example, the transmitter 10 can use FFT (Fast Fourier Transform) component, frequency histogram, power spectrum and other features.

Also, the transmitter 10 may use pitches such as a mean pitch and maximum pitch, and sound levels such as mean loudness and maximum loudness, as effective audio features for representation of audio segments.

Further features are those common to visual and audio segments. They are neither any visual feature nor audio feature, but provide useful information for representation of features of segments included in a scene. The transmitter 10 uses a segment length and an activity, as common visual-audio features.

As in the above, the transmitter 10 can use a segment length as a common visual-audio feature. The segment length is a time length of a segment. Generally, a scene has a rhythm feature inherent to itself. The rhythm feature appears as a change of segment length in a scene. For example, short segments contiguous to each other with a short time between them represent a commercial program. On the other hand, segments included in a conversation or dialogue scene are longer than those in a commercial program. Also, segments associated with each other in a dialogue scene are similar to each other. The transmitter 10 can use such feature segment length as a common visual-audio feature.

Also, the transmitter 10 can use an activity as a common visual-audio feature. The activity is an index indicating how dynamic or static the content of a segment feels. For example, if a segment visually feels dynamic, the activity indicates a rapidity with which a camera is moved along an object or with which an object being shot by the camera changes.

The activity is indirectly calculated by measuring a mean value of inter-frame dissimilarity in feature such as color histogram. A video activity VF is given by the following equation (1):

$$F = \frac{\sum_{i=b}^{f-1} d_F(i, i+1)}{f - b} \quad (1)$$

where i and j are frames, F is a feature measured between the frames i and j, $d_F(i, j)$ is a dissimilarity measurement criterion for the feature $d_F$, and b and f are numbers for a first frame and last frame in one segment. More specifically, the transmitter 10 can calculate the video activity $V_F$ using the above-mentioned histogram for example.

Figure 34:
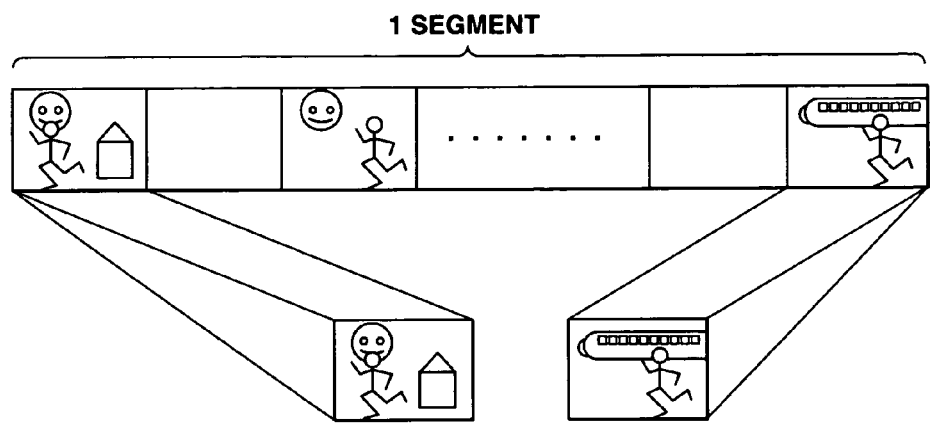
FIG. 34 shows how to sample a dynamic feature in the transmitter of the data transmitter-receiver system.

The features including the above-mentioned visual features basically indicate static information of a segment as in the above. To accurately represent the feature of a segment, however, dynamic information has to be taken in consideration. For this reason, the transmitter 10 represents dynamic information by a feature sampling method which will be described below:

As shown in FIG. 34 for example, the transmitter 10 extracts more than one static feature, starting at different time points in one segment. At this time, the transmitter 10 determines the number of features to extract by keeping a balance between a highest fidelity of segment depiction and a minimum data redundancy. For example, when a certain image in the segment can be designated as a key frame in that segment, a histogram calculated from the key frame will be a feature to extract.

Using the sampling method which will be described later, the transmitter 10 determines which of the samples extractable as feature of an object segment are to be selected.

Here, it will be considered that a certain sample is always selected at a predetermined time point, for example, at the last time point in a segment. In this case, samples from two arbitrary segments changing to black frames (fading) will be same black frames, so that no different features will possibly be acquired. That is, selected two frames will be determined to be extremely similar to each other whatever the image contents of such segments are. This problem will take place since the samples are not good central values.

For this reason, the transmitter 10 is adapted not to extract a feature at such a fixed point but to extract a statistically central value in an entire segment. Here, the general feature sampling method will be described concerning two cases that (1) a feature can be represented as a real-number n-dimensional vector and (2) only a dissimilarity measurement criterion can be used. It should be noted that best-known visual and audio features such as histogram, power spectrum, etc. are included in the features in the case (1).

In the case (1), the number of samples is predetermined to be k and the transmitter 10 automatically segments a feature of an entire segment into k different groups by using the well-known k-means clustering method as disclosed in "L. Kaufman and P. J. Rousseeuw: Finding Groups in Data: An Introduction to Cluster Analysis, John-Wiley and Sons, 1990". The transmitter 10 selects, as a sample value, a group centroid or a sample approximate to the centroid from each of the k groups. The complexity of the operations in the transmitter 10 is just the linearly increased number of samples.

On the other hand, in the case (2), the transmitter 10 forms the k groups by the use of the k-medoids algorithm method also disclosed in "L. Kaufman and P. J. Rousseeuw: Finding Groups in Data: An Introduction to Cluster Analysis, John-Wiley and Sons, 1990". The transmitter 10 uses, as a sample value, the above-mentioned group medoid for each of the k groups.

It should be noted that in the transmitter 10, the method for establishing the dissimilarity measurement criterion for features representing extracted dynamic features is based on the dissimilarity measurement criterion for static features on which the former method is based, which will further be described later.

Thus, the transmitter 10 can extract a plurality of static features to represent a dynamic feature using the plurality of static features.

As in the above, the transmitter 10 can extract various features. However, each of such features is generally insufficient for representation, by itself, of a segment feature. For this reason, the transmitter 10 can select a set of mutually complementary features by combining these different features. For example, the transmitter 10 can provide more information than that of each feature by combining the above-mentioned color histogram and image correlation with each other.

Figure 33:
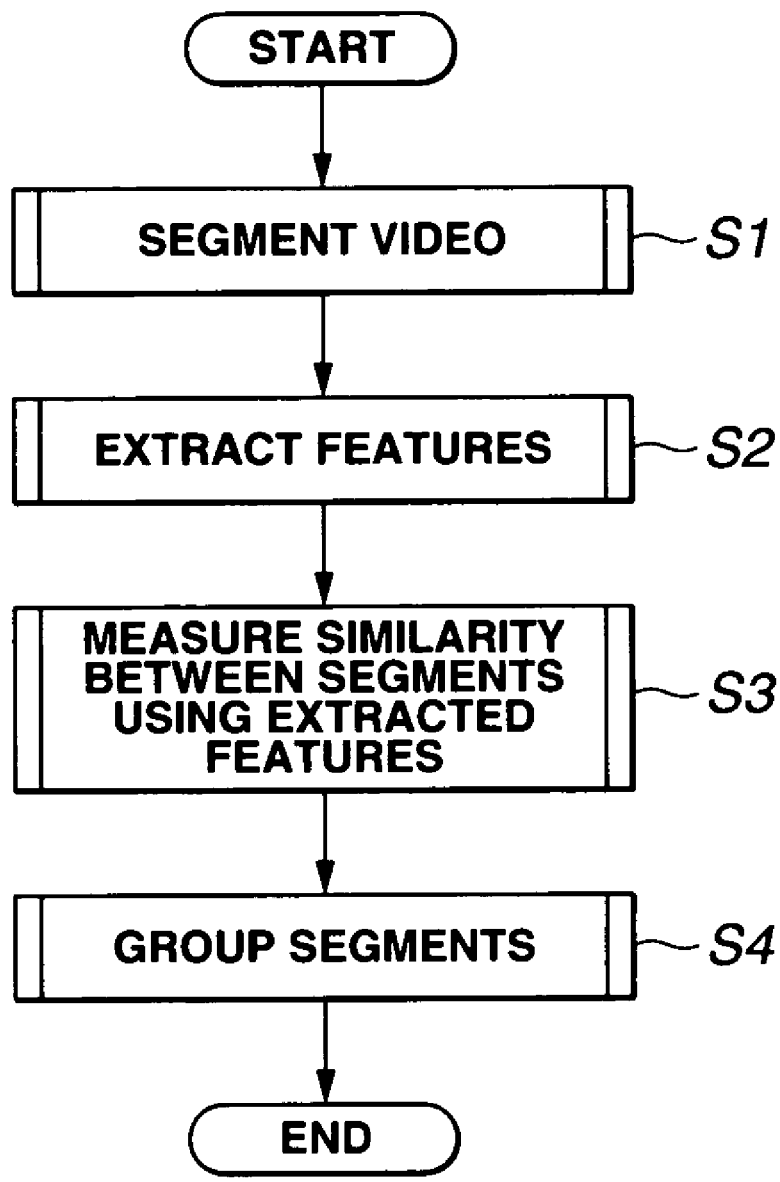
FIG. 33 is a flow chart of a series of operations effected in grouping segments and detecting a scene in the transmitter of the data transmitter-receiver system.

Next, the measurement of similarity between segments, in which the features acquired at step S3 in FIG. 33 are used, will be described herebelow. Using the dissimilarity measurement criterion being a function to calculate a real-number value with which it is determined how dissimilar two features are to each other, the transmitter 10 measures a dissimilarity between the segments. When the dissimilarity measurement criterion is small, it indicates that two features are similar to each other. If the criterion is large, it indicates that the two features are not similar to each other. The function for calculation of the dissimilarity between the two segments S1 and S2 concerning the feature F is defined as dissimilarity measurement criterion $d_F(S_1, S_2)$ This function has to meet the relation given by the equations (2) below.

$$d_F(S_1, S_2) = 0 \text{ (when } S_1 = S_2\text{)}$$

$$d_F(S_1, S_2) = 0 \text{ (for all } S_1 \text{ and } S_2\text{)}$$

$$d_F(S_1, S_2) = d_F(S_2, S_1) \text{ (for all } S_1 \text{ and } S_2\text{)} \quad (2)$$

It should be noted that some of the dissimilarity measurement criteria is only applicable to specific features. However, as disclosed in "G. Ahanger and T. D. C. Little: A Survey of Technologies for Parsing and Indexing Digital Video, Journal of Visual Communication and Image Representation 7: 28-4, 1996", and "L. Kaufman and P. J. Rousseeuw: Finding Groups in Data: An Introduction to Cluster Analysis, John-Wiley and Sons, 1990", many dissimilarity measurement criteria are generally applicable to the measurement of a similarity between features represented as points in a n-dimensional space. The features include a Euclidean distance, inner product, L1 distance, etc. Since of these features, the L1 distance will effectively act on various features including the histogram, image correlation, etc., the transmitter 10 adopts the L1 distance as a feature. On the assumption that two n-dimensional vectors are A and B, the L1 distance $d_{L1}(A, B)$ is given by the following equation (3):

$$d_{LI}(A, B) = \sum_{i=1}^{n} |A_i - B_i| \qquad (3)$$

where the subscript i indicates the i-th element of each of the n-dimensional vectors A and B.

As mentioned above, the transmitter 10 extracts, as features representing dynamic features, static features at different time points in a segment. Then, to determine a similarity between two extracted dynamic features, the transmitter 10 uses, as a criterion for determination of a dissimilarity, a criterion for measurement of a dissimilarity between the static features on which the similarity measurement criterion is based. In many cases, the dissimilarity measurement criterion for the dynamic features should most advantageously be established using a dissimilarity between a pair of static features selected from each dynamic feature and most similar to each other. In this case, the criterion for measurement of a dissimilarity between two extracted dynamic features $SF_1$ and $SF_2$ is given by the following equation (4):

$$d_S(SF_1, SF_2) = F_1 \in SF_1, F_2 \in SF_2 \overset{min}{d_F}(F_1, F_2) \qquad (4)$$

The function $d_F(F_1, F_2)$ in the equation (4) above indicates a criterion for measurement of a dissimilarity between the static features F on which the equation (4) is based. It should be noted that the a maximum or mean value of the dissimilarity between features may be taken instead of a maximum value as the case may be.

In the transmitter 10, only one feature is insufficient to determine a similarity between segments, and so in many cases it is necessary to combine information derived from many features for the same segment. A solution for this problem is to calculate a dissimilarity based on various features as a combination of respective features as weighted. That is, when there are available k features $F_1, F_2, \ldots, F_k$, the transmitter 10 uses a dissimilarity measurement criterion $d_F(S_1, S_2)$ for combined features. The criterion is given by the following equation (5):

$$d_F(S_1, S_2) = \sum_{i=1}^{k} w_i d_{Fi}(S_1, S_2) \qquad (5)$$

where $\{w_i\}$ is a weighting factor of $\Sigma_i w_i = 1$.

As in the above, the transmitter 10 can calculate a dissimilarity measurement criterion using features having been extracted at step S2 in FIG. 33 to determine a similarity between segments in consideration.

Next, the segment grouping at step S4 in FIG. 33 will be described herebelow. Using the dissimilarity measurement criterion and extracted features, the transmitter 10 repeatedly groups similar segments lying close to each other in time, and outputs a finally produced group as a detected scene.

When detecting a scene by grouping segments, the transmitter 10 effects two basic operations. One of the operations is to detect groups of similar segments lying close to each other in time. Most of the groups thus acquired will be a part of the same scene. The other operation effected in the transmitter 10 is to combine concurrent segment groups together. The transmitter 10 starts these operations with independent segments, and repeats them. Then the transmitter 10 organizes a step-by-step larger group of segments and outputs a finally produced group as a set of scenes.

To control these operations, the transmitter 10 is controlled under the following two constraints.

Figure 35:
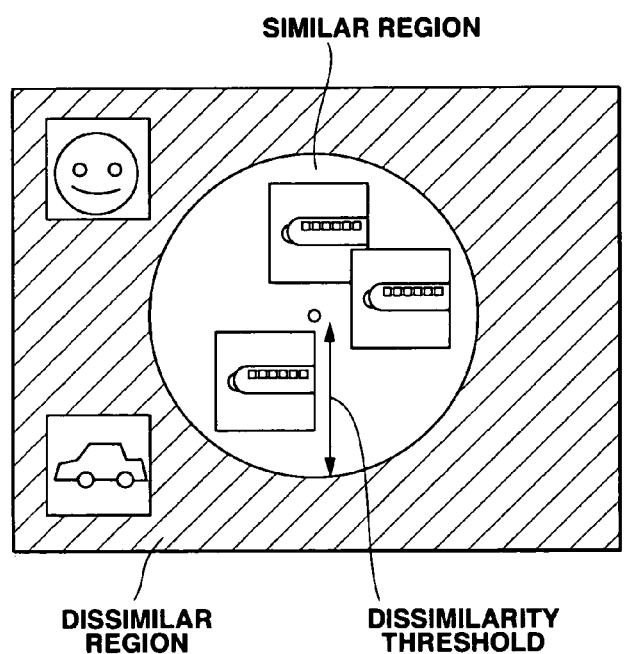
FIG. 35 explains a dissimilarity threshold.

Under one of the two constraints, the transmitter 10 has to adopt a dissimilarity threshold $\delta_{sim}$ to determine whether two similar segments belong to the same scene. As shown in FIG. 35 for example, the transmitter 10 judges whether one of the segments is similar or not similar to the other.

It should be noted that the transmitter 10 may be adapted to set the dissimilarity threshold $\delta_{sim}$ by the user or automatically as will be described later.

Figure 36:
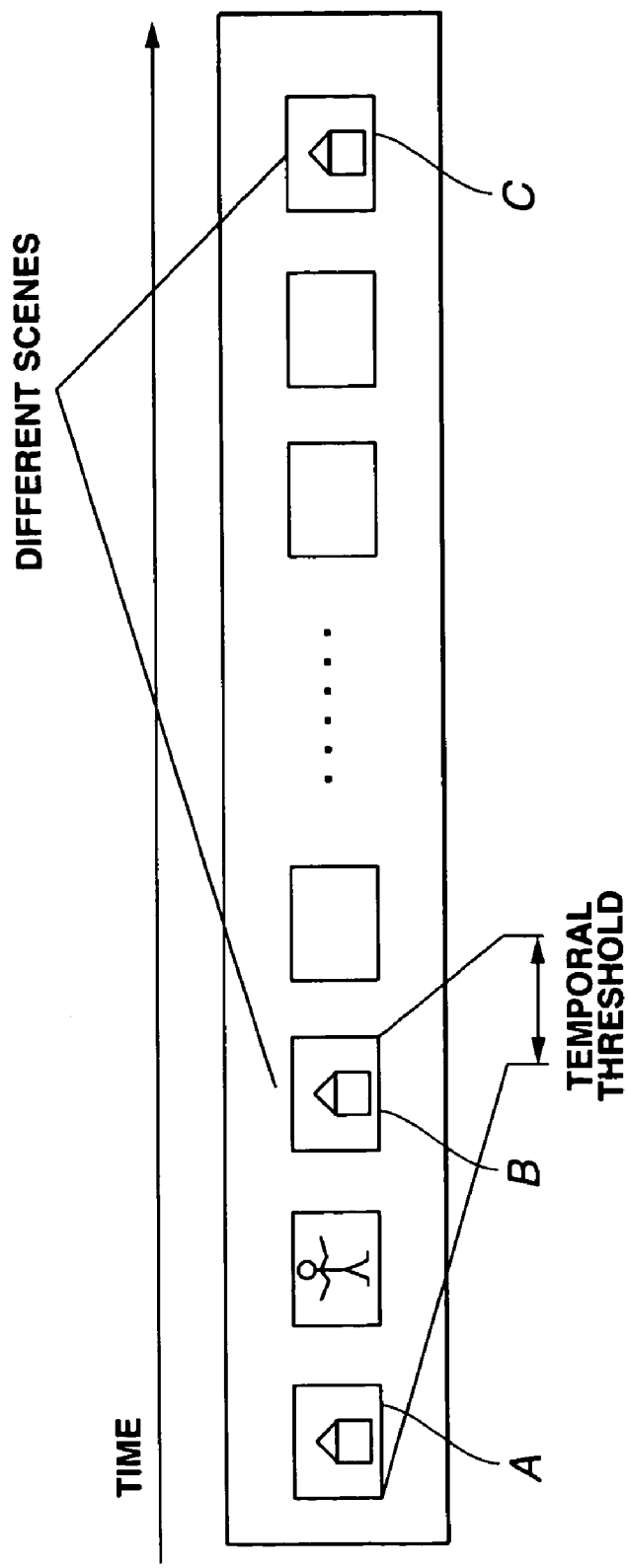
FIG. 36 explains a temporal threshold.

Under the second constraint, the transmitter 10 has to adopt a temporal threshold T as a maximum interval between two segments on the time base, based on which the two segments can be considered to be included in the same scene. As shown in FIG. 36 for example, the transmitter 10 puts, into the same scene, two similar segments A and B lying close to each other within the temporal threshold T but not two segments B and C similar to each other but having between them a time gap not within the temporal threshold T. Thus, because of the constraint by the temporal threshold T, the transmitter 10 will not erroneously put into the same scene two segments similar to each other but largely apart from each other on the time base.

Since it has been found that a time for 6 to 8 shots set as the temporal threshold T would generally give a good result, the transmitter 10 uses the temporal threshold T for 6 to 8 shots in principle.

It is assumed herein that to acquire a group of similar segments, the transmitter 10 adopts the hierarchical clustering method disclosed in "L. Kaufman and P. J. Rousseeuw: Finding Groups in Data: An Introduction to Cluster Analysis, John-Wiley and Sons, 1990". In this algorithm, a criterion $d_c(C_1, C_2)$ for determination of a dissimilarity between two clusters $C_1$ and $C_2$ is defined as a minimum similarity between elements included in each cluster. It is given by the following equation (6):

$$d_c(C_1, C_2) = S_1 \in C_1, S_2 \in C_2 \overset{min}{dist}_S(S_1, S_2) \qquad (6)$$

It should be noted that in the transmitter 10, a minimum function expressed by the equation (6) can easily be replaced with a maximum function or mean function.

Figure 37:
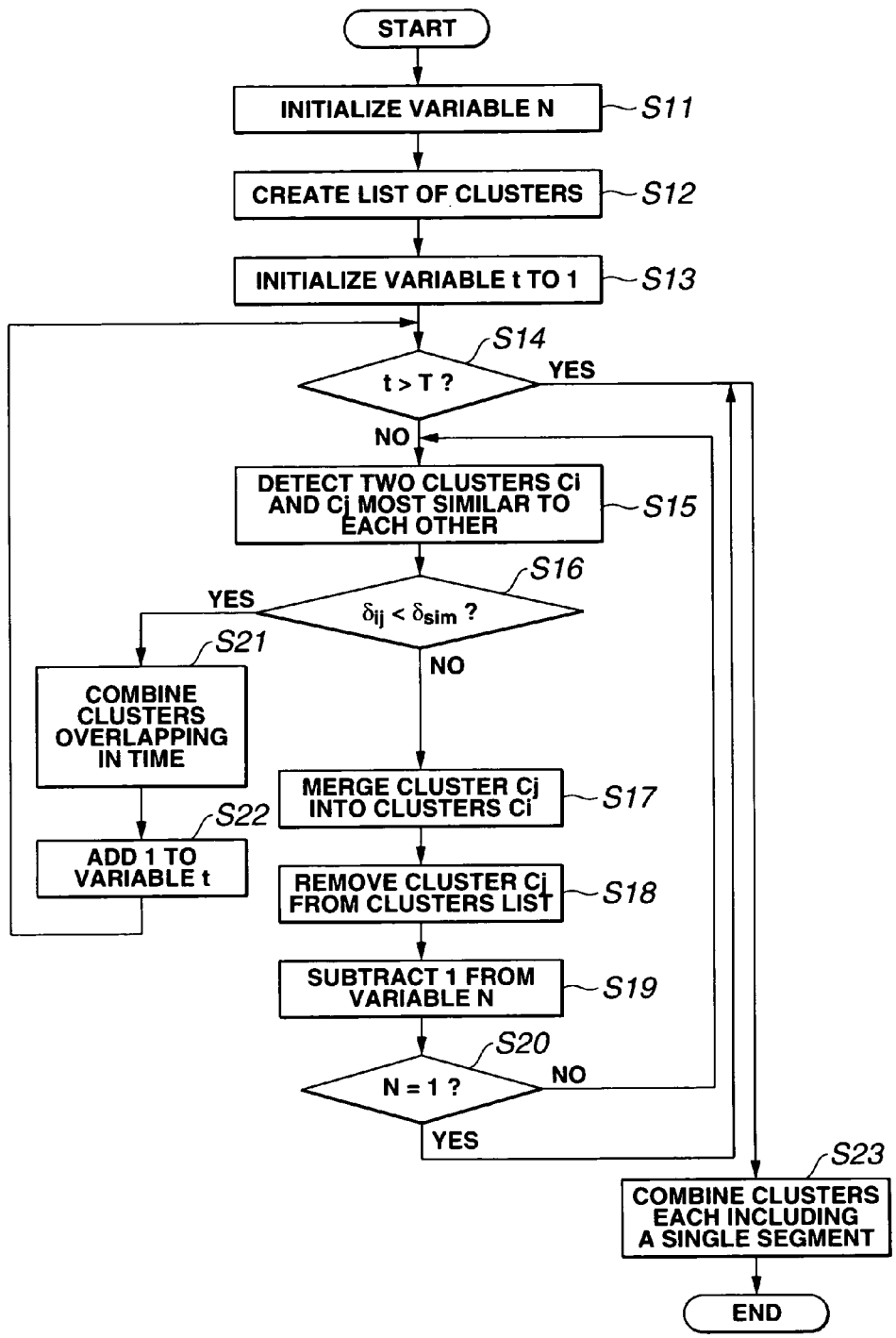
FIG. 37 is a flow chart of a series of operations effected in grouping segments in the transmitter of the data transmitter-receiver system.

First at step S11 in FIG. 37, the transmitter 10 initializes a variable N to the number of segments in the initial state. The variable N indicates the concurrent number of groups always detected.

Next at step S12, the transmitter 10 generates a set of clusters. In the initial state, the transmitter 10 takes N segments as different from each other. That is, there exist N clusters in the initial state. Each of the clusters has features indicating a start time and end time represented by $C^{start}$ and $C^{end}$, respectively. Elements included in each cluster are managed as a list in which they are arranged in order based on the start time $C^{start}$.

Next at step S13, the transmitter 10 initializes a variable t to 1. At step S14, the transmitter 10 judges whether the variable t is larger than the temporal threshold T. If the transmitter 10 determines that the variable t is larger than the temporal threshold T, it will go to step S23. When it determines that the variable t is smaller than the temporal threshold T, it will go to step S15. Since the variable t is 1, however, the transmitter 10 will go to step S15.

At step S15, the transmitter 10 calculates the dissimilarity measurement criterion $d_c$ to detect two of the N clusters that are the most similar to each other. Since the variable t is 1, however, the transmitter 10 will calculate the dissimilarity measurement criterion $d_c$ between adjacent clusters to detect among the adjacent clusters a pair of clusters that are the most similar to each other.

An approach to detect two clusters which are the most similar to each other may be to acquire all possible pairs of object clusters. However, since the variable t indicating a time interval between object clusters is given in segments and the clusters are arranged in the temporal order, the transmitter 10 should calculate the dissimilarity among t clusters before and after a certain cluster.

The two clusters thus detected are defined as $C_i$ and $C_j$, respectively, and a dissimilarity between the clusters $C_i$ and $C_j$ is defined as $d_{ij}$.

At step S16, the transmitter 10 will judge whether the dissimilarity $d_{ij}$ is larger than the dissimilarity threshold $\delta_{sim}$. When the dissimilarity $d_{ij}$ is judged larger than the dissimilarity threshold $\delta_{sim}$, the transmitter 10 will go to step S21. If the the dissimilarity $d_{ij}$ is judged smaller than the dissimilarity threshold $\delta_{sim}$, the transmitter 10 will go to step S17. It is assumed here that the dissimilarity $d_{ij}$ is smaller than the dissimilarity threshold $\delta_{sim}$.

At step S17, the transmitter 10 will merge the cluster $C_j$ into the cluster $C_j$. That is, the transmitter 10 will add to the cluster $C_i$ all the elements in the cluster $C_j$.

Next at step S18, the transmitter 10 will remove the cluster $C_j$ from the set of clusters. It should be noted that if the start time $C_i^{start}$ changes due to the combination of the two clusters $C_i$ and $C_j$, the transmitter 10 will rearrange the elements in the set of clusters based on the start time $C_i^{start}$.

Next at step S19, the transmitter 10 will subtract 1 from the variable N.

At step S20, the transmitter 10 will judge whether the variable N is 1 or not. If the variable N is judged to be 1, the transmitter 10 will go to step S23. When the transmitter 10 determines that the variable N is not 1, it will go to step S15. It is assumed here that the variable N is not 1.

Thus, at step S15, the transmitter 10 will calculate the dissimilarity measurement criterion $d_c$ again to detect two clusters the most similar to each other. Since the variable t is 1, the transmitter 10 will calculate the criterion $d_c$ for determination of the dissimilarity between adjacent clusters to detect a pair of clusters that are the most similar to each other.

Next at step S16, the transmitter 10 will judge whether the dissimilarity $d_{ij}$ is larger than the dissimilarity threshold $\delta_{sim}$. It is also assumed here that the dissimilarity $d_{ij}$ is smaller than the dissimilarity threshold $\delta_{sim}$.

The transmitter 10 will effect the operations at steps S17 to S20.

When as a result of the repetition of the above operations and subtraction of 1 from the variable N, it is determined at step S20 that the variable N is 1, the transmitter 10 will go to step S23 where it will combine together clusters each including a single segment. Finally, the transmitter 10 terminates the series of operations by grouping all segments into one cluster as in the above.

If the transmitter 10 determines at step S16 that the dissimilarity $d_{ij}$ is larger than the dissimilarity threshold $\delta_{sim}$, it will go to step S21 where it will repeatedly combine clusters which concurrently exist. Namely, if the time interval between $C_i^{start}$ and $C_i^{end}$ of the cluster $C_i$ is concurrent with that between $C_j^{start}$ and $C_j^{end}$ of the cluster $C_j$, the two clusters $C_i$ and $C_j$ overlap each other on the time base. Thus, the transmitter 10 can arrange the clusters in a set based on the start time $C_i^{start}$ of the cluster set to detect concurrent clusters and combine the clusters together.

At step S22, the transmitter 10 will add 1 to the variable t which will thus be t=2, and go to step S14 where it will judge whether the variable t is larger than the temporal threshold T. It is also assumed here that the variable t is smaller than the temporal threshold T and the transmitter 10 will go to step S15.

At step S15, the transmitter 10 will calculate the dissimilarity measurement criterion $d_c$ and detects two of a plurality of clusters existing currently, that are the most similar to each other. However, since the variable t is 2, the transmitter 10 calculates the criterion $d_c$ for determination of the dissimilarity between adjacent clusters as well as between every other clusters to detect a pair of clusters the most similar to each other.

Then at step S16, the transmitter 10 judges whether the dissimilarity $d_{ij}$ between adjacent clusters and every other clusters $C_i$ and $C_j$ is larger than the dissimilarity threshold $\delta_{sim}$. It is assumed here that the dissimilarity $d_{ij}$ is smaller than the dissimilarity threshold $\delta_{sim}$. After effecting the operations at steps S21 and S22, the transmitter 10 adds 1 to the variable t which will thus be t=3, and will move to step S14 and subsequent steps. When the variable t is 3, the transmitter 10 will calculate, at step S15, the criterion $d_c$ for determination of the dissimilarity between clusters existent down to every two clusters, and detect a pair of clusters which are the most similar to each other.

When as a result of the repetition of the above operations and addition of 1 to the variable t, it is determined at step S14 that the variable t is larger than the tine threshold T, the transmitter 10 will go to step S23 where it will combine clusters each including a single segment. That is, the transmitter 10 will take discrete clusters as ones each including a single segment. If there exist a sequence of such clusters, the transmitter 10 will combine them together. This process combines together segments having no relation in similarity with any adjacent scene. However, it should be noted that the transmitter 10 has not to always effect this process.

With this series of operations, the transmitter 10 can gather the plurality of clusters and generate a scene to be detected.

It should be noted that the transmitter 10 may be adapted to set the dissimilarity threshold $\delta_{sim}$ by the user or automatically determine it as having previously been described. However, when a fixed value is used as the dissimilarity threshold $\delta_{sim}$, the optimum value of the dissimilarity threshold $\delta_{sim}$ will depend upon the content of a video data. For example, for a video data whose content is variable, the dissimilarity threshold $\delta_{sim}$ has to be set to a high value. On the other hand, for a video data having a less-variable content, the dissimilarity threshold $\delta_{sim}$ has to be set to a low value. Generally, when the dissimilarity threshold $\delta_{sim}$ is high, less scenes will be detected. On the other hand, when dissimilarity threshold $\delta_{sim}$ is low, more scenes will be detected.

Thus, an optimum dissimilarity threshold $\delta_{sim}$ has to be determined since the performance of the transmitter 10 depends greatly upon the dissimilarity threshold $\delta_{sim}$. Therefore, when the transmitter 10 is adapted to set a dissimilarity threshold $\delta_{sim}$ by the user, the above has to be taken in consideration. On the other hand, the transmitter 10 may be adapted to automatically set an effective dissimilarity threshold $\delta_{sim}$ by using any of methods which will be described below.

One of the methods will be described by way of example. Namely, the transmitter 10 can acquire a dissimilarity threshold $\delta_{67\ sim}$ by using a statistic quantity such as mean value and median in distribution of the dissimilarity between (n)(n−1)/2 segment pairs. Assume here that the mean value and standard deviation of the dissimilarity between all segment pairs is $\lambda$ and $\sigma$, respectively. In this case, the dissimilarity threshold $\delta_{sim}$ can be represented by a form of $a\mu+b\sigma$ where a and b are constants. It has been found that setting of the constants a and b to 0.5 and 0.1, respectively, will assure a good result.

The transmitter 10 has not to determine any dissimilarity between all pairs of segments but should measure a dissimilarity by selecting at random from a set of all segment pairs a sufficient number of segment pairs to provide nearly real mean value $\mu$ and standard deviation $\sigma$. Using the mean value $\mu$ and standard deviation a thus determined, the transmitter 10 can automatically determine an appropriate dissimilarity threshold $\delta_{sim}$.

In the foregoing, the use of a single dissimilarity measurement criterion in the transmitter 10 has been described. In addition, the transmitter 10 can a weighting function to combine a variety of dissimilarity measurement criteria for different types of features in order to judge whether segments in pairs belong to the same group, as having previously been described. The features can only be weighted after trial and error, and when the features are different in type from each other, it is usually difficult to appropriately weight them. However, using a color histogram and texture feature, for example, in combination, the transmitter 10 can detect possible scenes for these features and synthesize a single scene structure from the structures of the detected scenes, thereby permitting to detect a scene in which both the color histogram and texture feature are included. Each of the results of scene detection for the features will be referred to as "scene layer" hereinafter. For example, when a color histogram and segment length are used as features, the transmitter 10 can detect scenes which are based on the features, respectively, to provide a scene layer for the color histogram and a one for the segment length. The transmitter 10 can combine these scene layers into a single scene structure.

Generally, information from video and audio domains cannot be combined in principle. Using a similar method to that for combining structures based on features different in quality from each other, the transmitter 10 can combine into a single scene structure scene layers obtainable based on information from video and audio domains.

Such an algorithm will be described herebelow. It is assumed here that there are k features $F_1, F_2, \ldots, F_k$ each representing one similarity criterion and there are available a dissimilarity measurement criterion $d_F^i$, dissimilarity threshold $\delta^i_{sim}$ and a temporal threshold $T^i$ correspondingly to the features $F^i$. Using the dissimilarity measurement criterion $d_F^i$, dissimilarity threshold $\delta^i_{sim}$ and a temporal threshold $T^i$ for the features $F_i$, the transmitter 10 detects a set of scene layers $X_i=\{X_i^j\}$. For example, the transmitter 10 detects divisional scene layers for video and audio information, respectively, and generates two independent scene layers $X_i=\{X_i^j\}$ (i=1, 2) for the video and audio information, respectively.

The transmitter 10 has to determine how to combine scene boundaries for combination of difference scene layers into a single scene structure. The scene boundaries do not always match one another. It is assumed here that for the scene layers, boundary points represented by a sequence of times indicating the scene boundaries are $t_{i1}, t_{i2}, \ldots, t_i|x_i|$. The transmitter 10 first selects a certain scene layer to be a basis for alignment of the boundary points in order to combine various scene layers into a single group. Then, the transmitter 10 determines for each of the boundary points $t_{i1}, t_{i2}, \ldots, t_i|x_i|$ whether other scene layers are those in the scene structure produced by finally combining the scene layers.

It is assumed here that the logical function indicating whether the i-th scene layer $X_i$ has a boundary point near a time t is $B_i(t)$. The term "near" varies depending upon the situation of the scene layer $X_i$, and it is for example 0.5 sec for combining scene layers based on video and audio information, respectively.

The transmitter 10 calculates the logical function $B_1(t_j)$ for each of the boundary points $t_j=t_{ij}$ when $j=1, \ldots, |X_j|$ and $i=1, \ldots, k$. The calculation result will indicate whether the boundary point exists near the time $t_j$ for each of the scene layers. The transmitter 10 uses $B_i(t_j)$ as a decision function when determining whether in the combined scene structure, the time $t_j$ is a scene boundary.

A simple example of the decision function is to count real $B_i(t_j)$ and regard the time $t_j$ was the scene boundary of the combined scene structure. Especially when m=1, it means that the boundary points of all the scene layers are the boundary points of the final scene structure. On the other hand, when m=k, it means that a scene boundary regarded as common to all the scene layers is the boundary point of the combined scene structure.

Thus, the transmitter 10 can combine difference scene layers into a single scene structure.

The result of processing in the transmitter 10 can be described using the aforementioned descriptors.

The descriptors used to describe the result of feature extraction at step S2 in FIG. 33 includes for example the ActivityLevel, Signature, TemporalSignature, Synopsis, etc.

The ActivityLevel as descriptor is used to describe an activities as visual and audio features obtained as the result of feature extraction. The Signature is used to describe a feature obtained as the result of feature extraction and intended for representation of static information of segments. Further, the TemporalSignature can be used to describe an optimum feature obtained as the result of feature extraction and intended to represent dynamic information of segments. Moreover, the Synopsis is used to describe that the scene detected at step S4 in FIG. 33 is to be represented by representative frames detected by the extraction of dynamic feature in the process of feature extraction.

Also, the descriptors used for description of the result of segment similarity measurement using the features at step S3 in FIG. 33 include the WeightVector, etc.

Further, the descriptors used to describe the result of segment grouping at step S4 in FIG. 33 include for example the AVPrototype, Cluster, CompositeSegment, AVGraph, Shot, Scene, etc.

The AVPrototype and Cluster as descriptors are used to describe the clusters of AVElement obtained as the result of grouping. The CompositeSegment is used to describe the clusters of AVSegment and scene obtained as the result of grouping. Further, the AVGraph as descriptor is used to describe the content of scenes detected at the step of grouping as a repeated structure of some scenes. Further, the Shot as descriptor is used to describe the shots on which the scene detection at the grouping step is based, and Scene as descriptor is used to describe the scenes detected at the grouping step.

Figure 38:
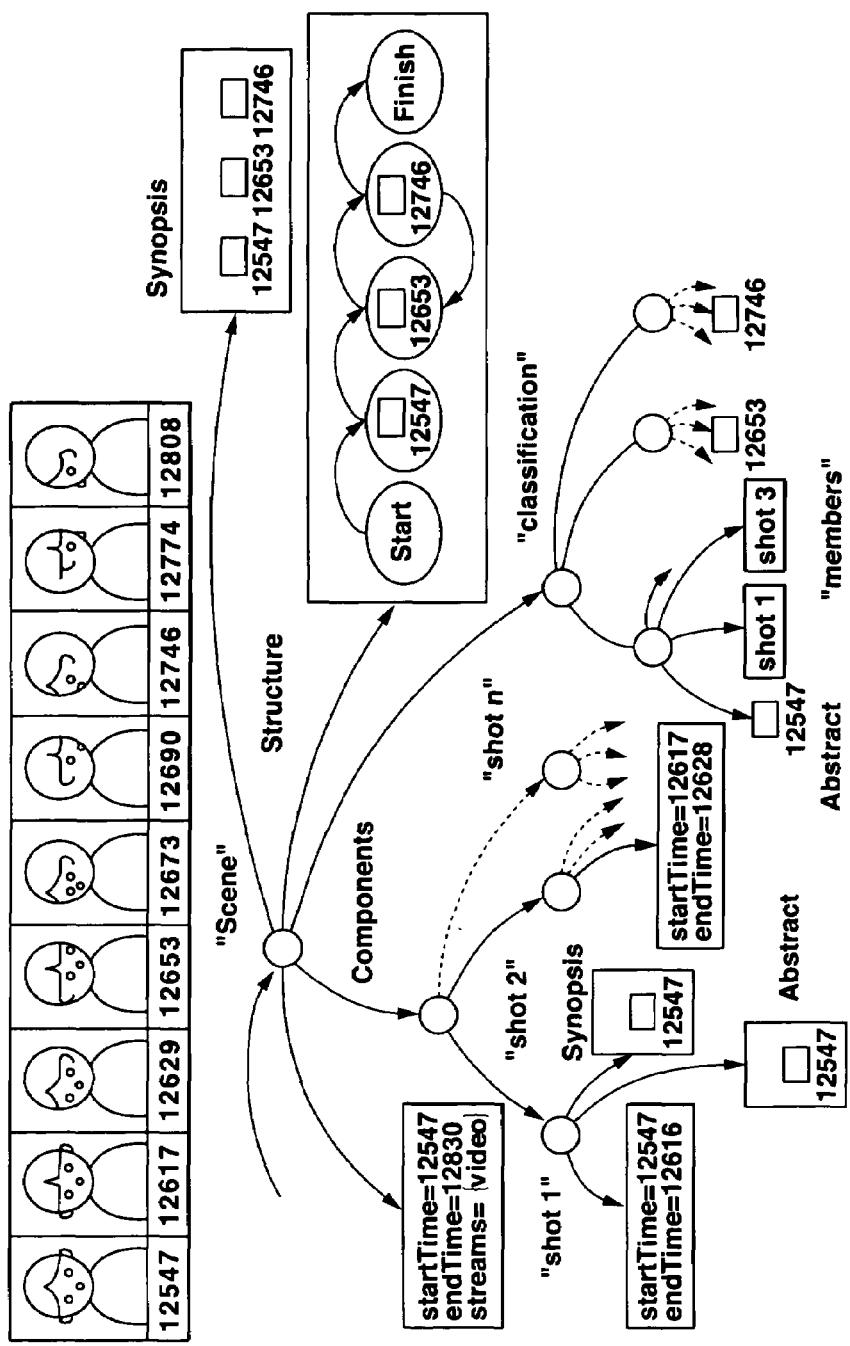
FIG. 38 explains an example of the description scheme for description of a scene.

Therefore, a description scheme for description of a scene structure in a certain video data is represented by a set of descriptors. A description scheme necessary for description of a certain scene and an example of description of scenes as feature data are shown in FIGS. 38 and 39. It is assumed here that a scene to be described starts at a frame No. 12547 and ends at a frame No. 12830. Note that in FIG. 39, the description following a semi-colon (;) indicates a class to which the reference descriptor in the line belongs.

First in the line 1 in FIG. 39, beginning of a descriptor specifying a description of a scene description specified. The node in FIG. 38 corresponding to this scene is a root node labeled "Scene".

Next, for the scene description, the startPoint and endPoint of a scene are specified with a time, frame number or the like in the lines 2 and 3 in FIG. 39. Note that in FIG. 38, the information is represented by startTime and endTime added to a root node.

Also, a reference video data for the scene description is addressed in the line 4 in FIG. 39.

Further in the line 5 in FIG. 39 of the scene description, the beginning of the Synopsis as descriptor is specified to designate KEY_FRAME for a user's browsing.

Next, in the line 6 in FIG. 39, it is specified by the Sequence as descriptor that there is described a sequence of AVElement's subsequently. The AVElement is a key frame.

The key frames for the first, second and third synopses are designated as KEY_FRAME 1, KEY_FRAME 2 and KEY_FRAME 3, respectively, in the lines 7, 8 and 9 in FIG. 39. Although KEY_FRAME 1, KEY_FRAME 2 and KEY_FRAME 3 are not concretely specified, they should be designated anywhere in practice.

Moreover, the end of the Sequence as descriptor and that of the Synopsis as descriptor are specified in the lines 10 and 11 in FIG. 39.

Next, the beginning of the Abstract as descriptor is specified in the line 12 in FIG. 39 to designate a representative part of the video content.

Further, the beginning of the Signature as descriptor is specified in the line 13 in FIG. 39 to designate a part of the scenes used for clustering and declare that the beginning is specified with SHOT_SIGNATURE.

Moreover, start of designating the members of Signature is specified in the line 14 in FIG. 39.

In the lines 15 and 16 in FIG. 39, the first, second and third members of the Signature as descriptor are specified to be shot1, shot2 and shot3, respectively. The shot1 and shot2 are defined in the lines 22 ad 32.

For the scene description, end of designating the Signature members is specified in the line 17 in FIG. 39.

Next, in the line 18 in FIG. 39, weighting of the Signature members is designated. The shot1 is weighted to be 0.1 while the shot2 and shot3 are weighted to be 0.45, respectively.

Then, end of the Signature and Abstract as descriptors is specified in the lines 19 and 20 in FIG. 39.

Next, beginning of the Components as descriptor is specified in the line 21 in FIG. 39 to designate components of the scene. The nodes in FIG. 38 corresponding to the components are the ones a step lower than the root node, that is, those labeled "shot1", "shot2" and "shotn".

In the line 22 in FIG. 39, beginning of the Shot as descriptor is specified to designate the descriptor for the first shot as shot1. It is declared that the content will be described subsequently.

Further in the lines 23 and 24 in FIG. 39, start and end points of the shot are designated by a time, frame number or the like. In FIG. 39, the startPoint is the frame No. 12547 and endPoint is the frame No. 12616 in this example. Note that this information is one step lower than the root node in FIG. 38 and specified by "startTime" and "endTime" appended to the node labeled "shot1".

In the line 25 in FIG. 39, beginning of the Abstract as descriptor is specified to designate a representative part of the content of the shot.

In the line 26 in FIG. 39, beginning of the Signature as descriptor is specified to designate a part of the shot for use in clustering and the like. It is declared here that the Signature is specified by FRAME_SIGNATURE.

Further in the line 27 in FIG. 39, it is specified that the Signature has only one member, to designate the frame number. It is described that the frame number is 12590.

In the line 28 in FIG. 39, it is designated to weight the members of the Signature as descriptor. Since the Signature has only one member, the weight will be 1.0.

End of the Signature, end of the Abstract and end of the Shot as descriptors are specified in the lines 29, 30 and 31, respectively, in FIG. 39.

Next in the line 32 in FIG. 39, beginning of the Shot as descriptor is specified to designate that the descriptor for the second shot is "shot2" and declare that the content of the shot will be described subsequently.

In the lines 33 and 34 in FIG. 39, start and end points of the Shot as descriptor are specified by a time, frame number or the like. The start point is specified here to be the frame No. 12617 while the end point is to be the frame No. 12628. In FIG. 38, this information is one step lower than the root node, and specified by "startTime" and "endTime" appended to the nose labeled "shot2".

In the line 35 in FIG. 39, many descriptors specifying the content of the shot in consideration are described, but they will not be described any longer herein.

In the line 36 in FIG. 39, end of the Shot as descriptor is specified.

In the lines 37 and 38 in FIG. 39, various descriptors specifying the contents of other shots and many descriptors specifying the shots respectively are described, but they will not be described any further.

In the line 39 in FIG. 39, end of the Components as descriptor is specified.

Next in the line 40 in FIG. 39, it is declared that some AVHierarchy as descriptor's specifying the index of the scenes will be described subsequently.

In the line 41 in FIG. 39, beginning of the Hierarchy as descriptor is specified to declare that the hierarchy will be specified by SHOT_INDEX.

In the line 42 in FIG. 39, beginning of the Cluster as descriptor is specified to declare that the first cluster will be described subsequently and the cluster has a descriptor "cluster1".

In the line 43 in FIG. 39, start of designating the members of the Cluster is specified.

In the line 44 in FIG. 39, it is designated that the members of the Cluster are shots whose descriptors are "shot2, shot4, . . . ".

Further in the line 45 in FIG. 39, end of designating the members of the Cluster is specified.

Next in the line 46 in FIG. 39, beginning of the Abstract as descriptor is specified to designate a representative part of the content of the Cluster.

In the line 47 in FIG. 39, the Prototype as descriptor is specified. It is specified herein that the descriptor for the representative part of the content of the cluster is "shot4".

In the lines 48 and 49 in FIG. 39, end of the Abstract as descriptor and end of Cluster as descriptor are specified.

Next in the lines 50 and 51 in FIG. 39, there is specified the Cluster as descriptor to declare that the second and third clusters have descriptors "cluster2" and "cluster3" respectively. Note that in such positions in the lines, there are specified many descriptors for describing the content of the clusters. However, the descriptors will not be described any longer.

In the line 52 in FIG. 39, end of the Hierarchy as descriptor is specified.

In the line 53 in FIG. 39, it is declared that the description of some AVHierarchy's specifying the index of the scenes is to end.

Further in the line 54 in FIG. 39, many other descriptors specifying the content of the scene are described, but they will not be described any further.

In the line 55 in FIG. 39, it is declared that some AVGraph's specifying the structure of the scene will be described subsequently.

In the line 56 in FIG. 39, beginning of the AVGraph as descriptor is specified to declare that the components of the edge of the AVGraph is SHOT_GROUP.

In the lines 57 to 61 in FIG. 39, the AVGraphEdge as descriptor is specified. In the line 57, it is specified that the AVGraph starts at "cluster1" which is the descriptor designated in the line 42.

Further in the lines 58, 59 and 60 in FIG. 39, it is specified that the AVGraph extends from the cluster1 to cluster2, from the cluster3 to cluster2 and from the cluster2 to cluster3, respectively.

In the line 61 in FIG. 39, it is specified that the AVGraph ends at cluster3, and in the line 62, end of the AVGraph as descriptor is specified.

In the line 63 in FIG. 39, it is declared that the description of some AVGraph's as descriptors specifying the scene structure is over.

In the line 64 in FIG. 39, many descriptors describing the other content of the scene are specified and then in the line 65, end of the descriptor indicating the scene description is specified.

As in the foregoing, the scene structure in a certain video data can be described as feature data using a plurality of descriptors.

The transmitter 10 generates such feature data according to the video data by means of the feature generator 12 shown in FIG. 2, and transmits them along with the video data to the receiver 20. Thus, the receiver 20 having received the feature data together with the video data, can easily restore the video structure of the video data just by analyzing the video data based on the feature data and thus generate a story board for example by means of the retrieval engine 23.

Therefore, the receiver 20 requires no highly advanced processing capability and large volume of computation resources for analysis of the video structure of a video data. Thus the receiver 20 can be manufactured inexpensively and the memory used therein may be of a small capacity one.

Without prior knowledge of the content structure of the video data, the user can easily and privately access to the video data and thus can have an efficient browsing of the data.

As having been described in the foregoing, the data describing method according to the present invention can implement an advanced method for retrieval of the content of a video data for browsing. The feature data described using the method can specify the video structure of a video data accurately, easily and efficiently. Also, since the descriptors are used which inherit from ones in the higher class, they can easily be extended to ones having higher functions to organize a highly extensible description scheme, and contribute to the reduction of the capacity for the feature data. Thus, the memory used in the receiver 20 can be of a reduced capacity type.

Note that the present invention is not limited to the embodiment having been described in the foregoing but each descriptor may not always be a one which inherits from a description in the higher class. In this case, however, it is necessary to newly prepare all descriptors in the higher class for one descriptor which inherits from the higher-class descriptors, for the feature data.

Also, the present invention may of course adopt any other approach for extraction of a video structure from a video data than having been described in the foregoing.

Thus, needless to say, the present invention may be modified appropriately without departing from the scope and spirit of the present invention.

INDUSTRIAL APPLICABILITY

As having been described in detail in the foregoing, the present invention provides the signal describing method for describing a feature data characteristic of the content of an input data, wherein a descriptor being a unit element defining a describing procedure is structured to have its attribute defined as lower-level element and may include other descriptor as attribute.

Therefore, the data describing method according to the present invention permits to provide a structured description of the feature data using a set of structured descriptors, and easily extract features of the content of input data based on the feature data.

Also the present invention provides the data processor for generating a feature data characteristic of the content of an input data, including means for generating a feature data on the basis of a descriptor being a unit element defining a describing procedure and which is structured to have its attribute defined as lower-level element and may include other descriptor as attribute.

Therefore, the data processor according to the present invention generates a structured feature data using a set of structured descriptors, and represent the features of the content of input data accurately, easily and efficiently based on the feature data.

Further the present invention provides data processor for utilizing a feature data characteristic of the content of an input data, including means for restoring a feature of the content of the input data by utilizing the feature data generated on the basis of a descriptor being a unit element defining a describing procedure and which is structured to have its attribute defined as lower-level element and may include other descriptor as attribute.

Therefore, the data processor according to the present invention restores the content of the input data on the basis of the feature data, and extract the features of the content of input data without the necessity of any highly advanced processing capability and large volume of computation resources.

What is claimed is:

1. A signal describing method for describing feature data characteristic of input data, comprising the steps of:
   dividing said input data into a plurality of segments;
   calculating features of a respective segment, wherein a color feature is calculated by denoting a color histogram;
   measuring similarities between segments based on their calculated features;
   grouping said segments into scenes based on their calculated features and measured similarities;
   generating feature data corresponding to said scenes;
   transmitting said feature data with said input data,
   wherein said feature data is described using descriptors each having its attributes defined as lower-level elements;
   establishing a dissimilarity threshold by a user-defined setting or an automated setting; and
   establishing a temporal threshold as a maximum interval between two segments on a time base,
   wherein two segments that have a time gap that exceeds the temporal threshold are determined to be in different scenes.

2. The method as set forth in claim 1, wherein the input data includes at least one of visual data and audio data included in a video data.

3. The method as set forth in claim 1, wherein the descriptor is generated to inherit functions from a higher-class descriptor including the capability of structuring.

4. The method as set forth in claim 1, wherein the attribute as the lower-level element is structured by defining the attribute of the descriptor and/or a special attribute.

5. A data processor for generating feature data characteristic of input data, comprising:
   dividing means for dividing said input data into a plurality of segments;
   calculating means for calculating features of a respective segment, said calculating means being operable to calculate a color feature denoting a color histogram;
   measuring means for measuring similarities between segments based on their calculated features;
   grouping means for grouping said segments into scenes based on their calculated features and measured similarities;
   generating means for generating feature data corresponding to said scene;
   transmitting means for transmitting said feature data with said input data,
   wherein said feature data is described using descriptors each having its attributes defined as lower-level elements;
   means for establishing a dissimilarity threshold by a user-defined setting or an automated setting; and
   means for establishing a temporal threshold as a maximum interval between two segments on a time base,
   wherein two segments that have a time gap that exceeds the temporal threshold are determined to be in different scenes.

6. The apparatus as set forth in claim 5, wherein the input data includes at least one of visual data and audio data included in a video data.

7. The apparatus as set forth in claim 5, wherein the descriptor is generated to inherit functions from a higher-class descriptor including the capability of structuring.

8. The apparatus as set forth in claim 5, wherein the attribute as the lower-level element is structured by defining the attribute of the descriptor and/or a special attribute.

9. The apparatus as set forth in claim 5, wherein the feature data is sent along with the input data to an external apparatus.

10. A data processor for utilizing feature data characteristic of input data, comprising:
    dividing means for dividing said input data into a plurality of segments;
    calculating means for calculating features of a respective segment, said calculating means being operable to calculate a color feature denoting a color histogram;
    measuring means for measuring similarities between segments based on their calculated features;
    grouping means for grouping said segments into scenes based on their calculated features and measured similarities;
    generating means for generating feature data corresponding to said scene;
    transmitting means for transmitting said feature data with said input data;
    means for restoring a feature of the input data using feature data described with descriptors each having its attributes defined as lower-level elements;
    means for establishing a dissimilarity threshold by a user-defined setting or an automated setting; and
    means for establishing a temporal threshold as a maximum interval between two segments on a time base,
    wherein two segments that have a time gap that exceeds the temporal threshold are determined to be in different scenes.

11. The apparatus as set forth in claim 10, wherein the input data includes at least one of visual data and audio data included in a video data.

12. The apparatus as set forth in claim 10, wherein the descriptor is generated to inherit functions from a higher-class descriptor including the capability of structuring.

13. The apparatus as set forth in claim 10, wherein the attribute as the lower-level element is structured by defining the attribute of the descriptor and/or a special attribute.

14. The apparatus as set forth in claim 10, wherein the feature data is received along with the input data from an external apparatus.

* * * * *